United States Patent
Si et al.

(10) Patent No.: US 8,670,778 B2
(45) Date of Patent: Mar. 11, 2014

(54) DYNAMIC SECTORS IN A WIRELESS COMMUNICATION SYSTEM

(75) Inventors: Jie Si, San Diego, CA (US); Rilun Tang, San Diego, CA (US); Syed Nadeem Ahsan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 679 days.

(21) Appl. No.: 12/561,042

(22) Filed: Sep. 16, 2009

(65) Prior Publication Data

US 2010/0081439 A1   Apr. 1, 2010

Related U.S. Application Data

(60) Provisional application No. 61/101,020, filed on Sep. 29, 2008.

(51) Int. Cl.
*H04W 72/00* (2009.01)

(52) U.S. Cl.
USPC ........... 455/453; 455/436; 455/439; 455/450; 455/63.4; 370/334; 370/339

(58) Field of Classification Search
USPC .............. 455/436–444, 450–455, 422.1, 464, 455/509, 63.4, 82, 83, 561, 562.1, 575.7; 370/431–463, 321–337, 339, 341–348
See application file for complete search history.

(56) References Cited

U.S. PATENT DOCUMENTS

| | | | |
|---|---|---|---|
| 4,032,922 A | 6/1977 | Provencher | |
| 4,584,581 A | 4/1986 | Teshirogi | |
| 5,115,248 A | 5/1992 | Roederer | |
| 5,544,128 A | 8/1996 | Kim et al. | |
| 5,686,926 A | 11/1997 | Kijima et al. | |
| 5,890,067 A | 3/1999 | Chang et al. | |
| 6,167,286 A | 12/2000 | Ward et al. | |
| 6,252,560 B1 | 6/2001 | Tanaka et al. | |
| 6,400,697 B1 | 6/2002 | Leung et al. | |
| 6,597,927 B1* | 7/2003 | Eswara et al. | 455/562.1 |
| 7,136,675 B2* | 11/2006 | Jechoux | 455/562.1 |
| 2003/0162551 A1* | 8/2003 | Atarashi et al. | 455/456 |
| 2005/0003865 A1 | 1/2005 | Lastinger et al. | |
| 2005/0070331 A1* | 3/2005 | Higuchi et al. | 455/562.1 |
| 2005/0136963 A1* | 6/2005 | Frank et al. | 455/522 |
| 2007/0129071 A1* | 6/2007 | Shapira | 455/422.1 |
| 2010/0004022 A1* | 1/2010 | Lorentzon | 455/553.1 |

FOREIGN PATENT DOCUMENTS

| | | |
|---|---|---|
| CN | 1528099 A | 9/2004 |
| EP | 1063791 A2 | 12/2000 |
| EP | 1799000 A2 | 6/2007 |
| JP | 2001008262 A | 1/2001 |

(Continued)

OTHER PUBLICATIONS

International Search Report and Written Opinion—PCT/US2009/057312—ISA/EPO—Feb. 12, 2010.

(Continued)

*Primary Examiner* — Ronald Eisner

(74) *Attorney, Agent, or Firm* — Abdollah Katbab

(57) ABSTRACT

A method for dynamic sector creation is disclosed. The method may include determining that a first sector of a cell is overloaded. The method may also include creating a second sector within the first sector. The method may further include transferring one or more mobile stations from the first sector to the second sector.

31 Claims, 18 Drawing Sheets

(56) References Cited

FOREIGN PATENT DOCUMENTS

| | | |
|---|---|---|
| JP | 2001036949 A | 2/2001 |
| JP | 2007166353 A | 6/2007 |
| WO | WO02091779 A1 | 11/2002 |
| WO | WO2004049747 A2 | 6/2004 |

OTHER PUBLICATIONS

Taiwan Search Report—TW098132945—TIPO—Nov. 29, 2012.

* cited by examiner

DYNAMIC SECTORS IN A WIRELESS COMMUNICATION SYSTEM

RELATED APPLICATIONS

This application is related to and claims priority from U.S. Provisional Patent Application Ser. No. 61/101,020 filed Sep. 29, 2008, for "Fully Dynamic Sector Creation/Allocation in a Wireless System Using Multi-Beam Antennas," with inventors Jie Si and Rilun Tang.

TECHNICAL FIELD

The present disclosure relates generally to wireless communication systems. More specifically, the present disclosure relates to systems and methods for dynamic sector creation/allocation in a wireless communication system.

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers, and the like. Consumers have come to expect reliable service, expanded areas of coverage, and increased functionality.

In current second generation (2G) and third generation (3G) network implementations, a cell's coverage area is mainly dependent on the antenna pattern and down tilt of the antennas. Once an antenna is installed and tilt angle is fixed, the coverage of the cell is substantially fixed. Cell breathing may not change the coverage area. Over time the network may become imbalanced. An imbalanced network may have some portions of the network that are very busy or have a heavy load, while other portions of the network may not be very busy or have a light load. For example, some cells may have overloaded traffic, such as downtown areas or other areas with a dense population. Other cells may have a very small traffic load, such as rural areas with a sparse population. The current solution for the overloaded area is to add more cells, introduce more carriers, etc.

However, the solutions to overloaded areas of adding more cells, introducing more carriers, etc., are expensive and may not make the most efficient use of the available resources. It would be beneficial if systems and methods were provided that improved the efficiency of wireless communication systems.

DETAILED DESCRIPTION

Figure 1:
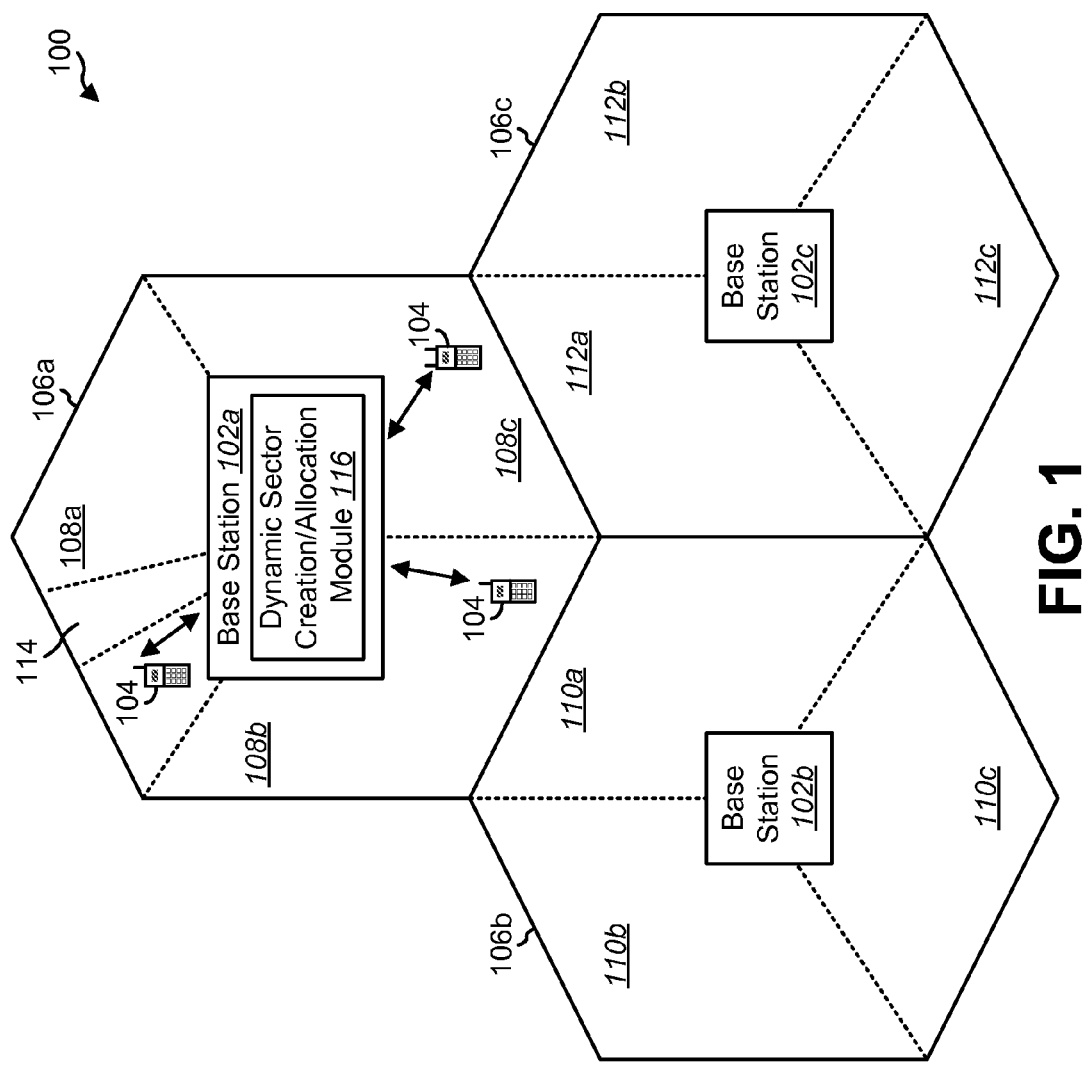
FIG. 1 illustrates a wireless communication system including multiple base stations and multiple mobile stations.

A method for dynamic sector creation is disclosed. The method includes determining that a first sector of a cell is overloaded. A second sector is created within the first sector. One or more mobile stations are transferred from the first sector to the second sector.

Determining that the first sector of the cell is overloaded may include comparing the load of the first sector with a loading threshold. The first sector may be overloaded if the load of the first sector is greater than the loading threshold. The method may include communicating with two or more mobile stations as part of the first sector using a multiple beam antenna. One or more beams of the multiple beam antenna may be identified to use in the second sector. One or more mobile stations communicating with the identified one or more beams may be identified for use in the second sector. A handoff message may be sent to the one or more mobile stations.

The one or more beams may be reallocated to operate as the second sector. The method may include communicating with the identified one or more mobile stations as part of the second sector using the reallocated one or more beams. Resources may be allocated from a donor cell. Allocating resources from a donor cell may include selecting a cell with less load within repeater range to operate as the donor cell for the second sector. Communications may be relayed between the donor cell and mobile stations in the second sector.

Communicating with two or more mobile stations as part of the first sector may include using a first pseudo noise (PN) code. Reallocating the one or more beams to operate as the second sector may include using a second PN code by the one or more beams to operate as the second sector. The method may be performed by a base station. The handoff message may be selected from the group consisting of a universal handoff direction message (UHDM), an extended handoff direction message and an active set update message. The loading threshold may be based on at least one of the following: a number of mobile stations, a reverse signal power, handoff statistics, a reverse pilot report, sector noise floor and sector voice activity in a sector.

The method may also include communicating with one or more mobile stations as part of the first sector. The method may further include communicating with one or more mobile stations as part of the second sector. One or more mobile stations may be transferred from the second sector to the first sector. The second sector may be removed. A load of the first sector and second sector may be compared with a minimum loading threshold. One or more beams of the second sector may be identified to return to the first sector if the load is less than the minimum loading threshold. The mobile stations communicating with the identified one or more beams of the second sector may be identified. Removing the second sector may include combining the identified one or more beams to operate as part of the first sector.

A base station configured for dynamic sector creation is described. The base station includes a processor and memory in electronic communication with the processor. The base station includes instructions stored in the memory. The instructions are executable to determine that a first sector of a cell is overloaded. The instructions are also executable to create a second sector within the first sector. The instructions are further executable to transfer one or more mobile stations from the first sector to the second sector.

An apparatus for dynamic sector creation is described. The apparatus includes means for determining that a first sector of a cell is overloaded. The apparatus also includes means for creating a second sector within the first sector. The apparatus further includes means for transferring one or more mobile stations from the first sector to the second sector.

A computer-program product for a wireless device configured for dynamic sector creation is also described. The computer-program product includes a computer-readable medium having instructions thereon. The instructions include code for determining that a first sector of a cell is overloaded. The instructions also include code for creating a second sector within the first sector. The instructions further include code for transferring one or more mobile stations from the first sector to the second sector.

An apparatus for dynamic sector allocation is described. The apparatus includes means for determining that a first sector of a cell is overloaded. The apparatus also includes means for creating a second sector within the first sector. The apparatus further includes means for building connections between the second sector and a donor cell. The apparatus also includes means for transferring one or more mobile stations from the first sector to the second sector.

A computer-program product for a wireless device configured for dynamic sector creation is described. The computer-program product includes a computer-readable medium having instructions thereon. The instructions include code for determining that a first sector of a cell is overloaded. The instructions also include code for creating a second sector within the first sector. The instructions further include code for building connections between the second sector and a donor cell. The instructions also include code for transferring one or more mobile stations from the first sector to the second sector.

A wireless communication device may be referred to as a mobile station, a subscriber station, an access terminal, a remote station, a user terminal, a terminal, a subscriber unit, user equipment (UE), etc. The term "mobile station" will be used herein.

A wireless communication system may provide communication for a number of cells, each of which may be serviced by a base station. A base station may be a fixed or semi-fixed (as compared to a mobile station) station that communicates with wireless communication devices or mobile stations. A base station may also be referred to as, and may include some or all of the functionality of, an access point, a broadcast transmitter, a Node B, an evolved Node B, etc. The term "base station" will be used herein.

A base station may transmit over one or more sectors. For example, a base station may have multiple areas of coverage. Each area of coverage may be referred to as a sector. In one configuration, each sector for a base station may cover 120 degrees around the base station. The location of a mobile station may be such that signals from more than one sector of a single base station are concurrently received.

A mobile station may communicate with one or more base stations via transmissions on the uplink and the downlink. The uplink (or reverse link) refers to the communication link from the mobile station to the base station, and the downlink (or forward link) refers to the communication link from the base station to the mobile station. A wireless communication system may simultaneously support communication for multiple mobile stations. One or more channel elements may provide signal processing for the uplink and downlink channels.

Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, orthogonal frequency division multiple access (OFDMA) systems, and spatial division multiple access (SDMA) systems.

Wireless communication systems may use standards for the wireless transmission of data through radio signals. One example of such a standard is Evolution-Data Optimized (EVDO). EVDO may use both CDMA and TDMA techniques.

FIG. 1 illustrates a wireless communication system 100 including multiple base stations 102 and multiple mobile stations 104. The mobile stations 104 may be cellular phones, personal digital assistants (PDAs), handheld devices, wireless modems, laptop computers, personal computers, wireless networking cards, etc. Each base station 102 may be capable of communicating with multiple mobile stations 104 at the same time. For clarity, only three mobile stations 104 are shown and all three are communicating with the first base station 102a. However, additional mobile stations 104 may communicate with the first base station 102a. Furthermore, mobile stations 104 may also be in wireless communication with the second base station 102b and the third base station 102c.

Each base station may have a coverage area referred to as a cell 106. For example, the first base station 102a may cover a first cell 106a, the second base station 102b may cover a second cell 106b, and the third base station 102c may cover a third cell 106c. Each of the cells may further be divided into sectors. For example, the first cell 106a may be divided into a first sector 108a, a second sector 108b and a third sector 108c. The second cell 106b may be divided into a first sector 110a, a second sector 110b and a third sector 110c. The third cell 106c may be divided into a first sector 112a, a second sector 112b, and a third sector 112c.

A base station 102 may communicate wirelessly with a mobile station 104. For example, a base station 102 may send electronic communications to the mobile station 104 over a forward link transmission. Similarly, the mobile station 104 may send electronic communications to the base station 102 over a reverse link transmission. Communications between a base station 102 and a mobile station 104 may be facilitated by multiple-beam antennas on the base station 104. The multiple-beam antenna may be capable of generating multiple beams.

A mobile station 104 may receive traffic information from one base station 102. A mobile station 104 may also receive interference from one or more base stations 102. In one configuration, the mobile station 104 may receive traffic information from one sector 108 of a base station 102a while concurrently receiving interference from another sector 108 of the base station 102. Thus, a mobile station 104 may receive both traffic information and interference from a single base station 102.

A base station may include a dynamic sector creation/allocation module 116. The dynamic sector creation/allocation module 116 and its operation are discussed in further detail below. The dynamic sector creation/allocation module 116 may assist the base station 102a in splitting and/or combining portions of sectors 108 to achieve a balanced network. For a CDMA network, achieving a balanced network may provide maximum capacity. For example, network imbalance may cause extra costs, low service quality, etc. Some cells 106 in a network may have reached maximum capacity while other cells 106 are provided for coverage purposes but are minimally used. Reusing current resources in the network may provide benefits in capacity and performance. One way to reuse resources may be to create an additional sector 114 within a sector 108a.

Figure 2:
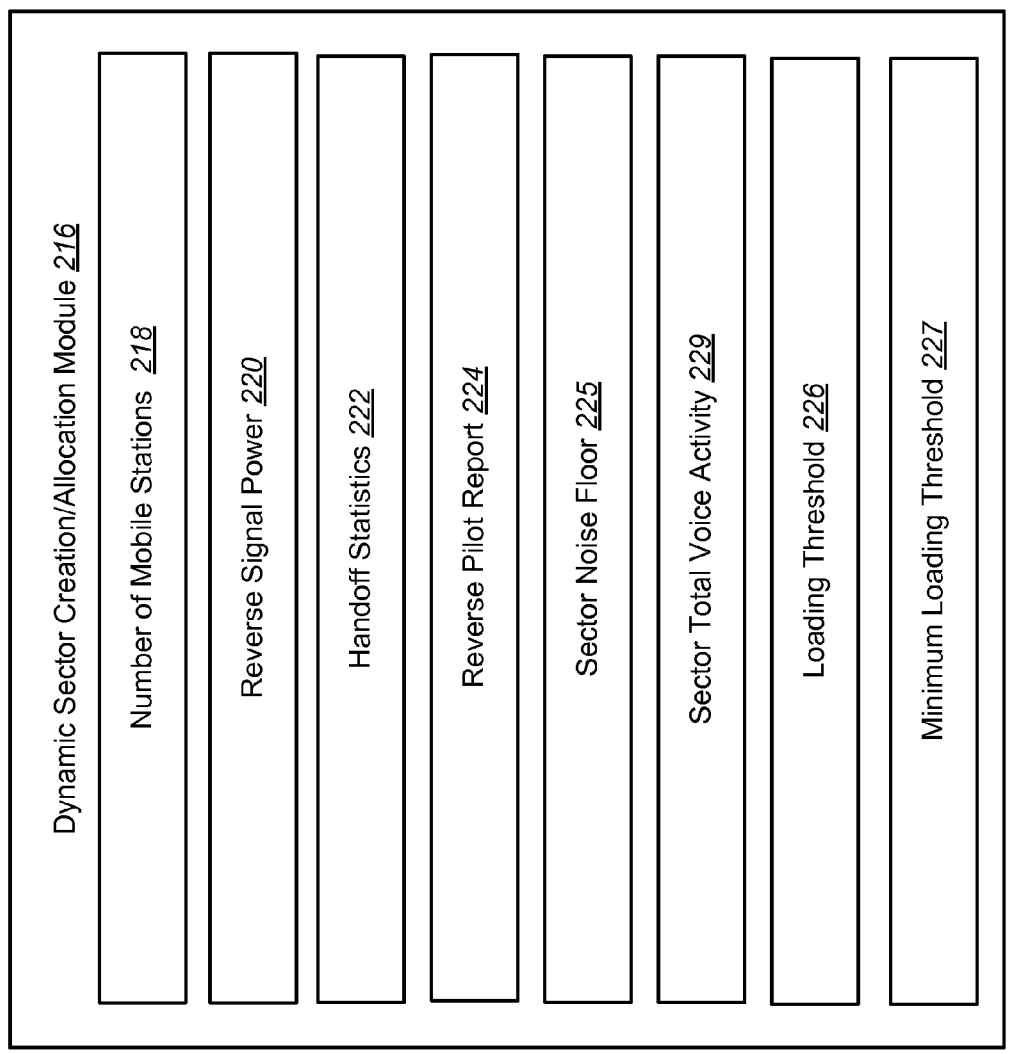
FIG. 2 is a block diagram illustrating a dynamic sector creation/allocation module.

FIG. 2 is a block diagram illustrating pieces of data that may be stored and/or used by a dynamic sector creation/allocation module 216. The dynamic sector creation/allocation module 216 of FIG. 2 may be one configuration of the dynamic sector creation/allocation module 116 of FIG. 1. The dynamic sector creation/allocation module 216 may use one or more criteria for determining sector creation and/or sector allocation. Sector creation refers to the creation of new sectors 114 within an existing sector 108a. Sector allocation refers to the use of donor cells to provide processing for mobile stations 104 within a sector.

The dynamic sector creation/allocation module 216 may include the number of mobile stations 218. The number of mobile stations 218 may include the current number of mobile stations 104 within each sector 108 for a base station 102. In one configuration, the number of mobile stations 218 may include the number of mobile stations 104 within the coverage range of each beam of the multiple-beam antenna. Because the main objective of the dynamic sector creation/allocation module 216 is to dynamically balance the network load to achieve overall maximum capacity, the channel elements being used can be one criterion for sector creation/sector allocation. The number of mobile stations 218 may also include the loading of nearby base stations 102. For example, the number of mobile stations 218 may indicate the relative load of a potential donor cell.

The dynamic sector creation/allocation module 216 may include the reverse signal power EbNt 220. The reverse signal power 220 may be measured at the base station 102. In general, increases in interference and/or sector load may lead to a decrease in reverse signal power 220. Thus, the reverse signal power 220 may be used to determine the need for sector creation/sector allocation.

The dynamic sector creation/allocation module 216 may include handoff statistics 222. For example, handoff statistics 222 may include the number of handoff requests for the sector 108. Higher statistics may indicate that more mobile stations 104 are coming into the sector 108. For example, the number of pilot add requests minus the number of pilot drop requests may indicate how busy a sector 108 is. Depending on how busy a sector 108 is, the dynamic sector creation/allocation module 216 may determine the need for sector creation/sector allocation.

The dynamic sector creation/allocation module 216 may include a reverse pilot report 224. Some technologies such as EVDO and High Speed Packet Access (HSPA) may require the mobile station 104 to report radio frequency (RF) conditions to the network as a reverse pilot report 224. One piece of information in the reverse pilot report 224 is the interference level. The network may use the interference level as a criterion for determining when to perform dynamic sector creation/allocation.

The dynamic sector creation/allocation module 216 may include a sector noise floor 225. A base station 102 may monitor the total noise floor on the reverse link. The more mobile stations 104 that are in a sector 108, the higher the total noise floor. The network may use the overall sector noise floor 225 as a criterion for determining when to perform dynamic sector creation/allocation.

The dynamic sector creation/allocation module 216 may also include a sector total voice activity 229. The sector total voice activity 229 may not be restricted to the activity of conversation. Instead, sector total voice activity 229 may refer to the overall mobile station 104 activities including voice, data transfer, etc. A higher amount of activity equals a busier sector 108. The network may determine when to perform dynamic sector creation/allocation based on the overall activity.

The dynamic sector creation/allocation module 216 may also include the loading threshold 226. The loading threshold 226 may be a preset threshold defining the maximum amount of load within a sector 108 before dynamic sector creation/allocation is performed. For example, the loading threshold 226 may define a particular threshold of mobile stations 104 being served such that dynamic sector creation occurs when the threshold is exceeded. In one more specific example, if the loading threshold 226 was 20, when the number of mobile stations 104 being served within a sector 108 exceeds twenty (20), then dynamic sector creation may occur. For each criterion in the dynamic sector creation/allocation module, there may be a corresponding loading threshold 226. If a particular criterion is used (e.g., the number of mobile stations 218 or the reverse signal power 220), the corresponding loading threshold 226 may be used. The dynamic sector creation/allocation module 216 may include a minimum loading threshold 227. The minimum loading threshold 227 may be a preset threshold defining the minimum amount of load within multiple sectors 108 before sector deletion is performed. Sector deletion may refer to the cancellation of one sector 108 and transfer of the mobile stations 104 within the sector 108 to another sector 108.

Figure 3:
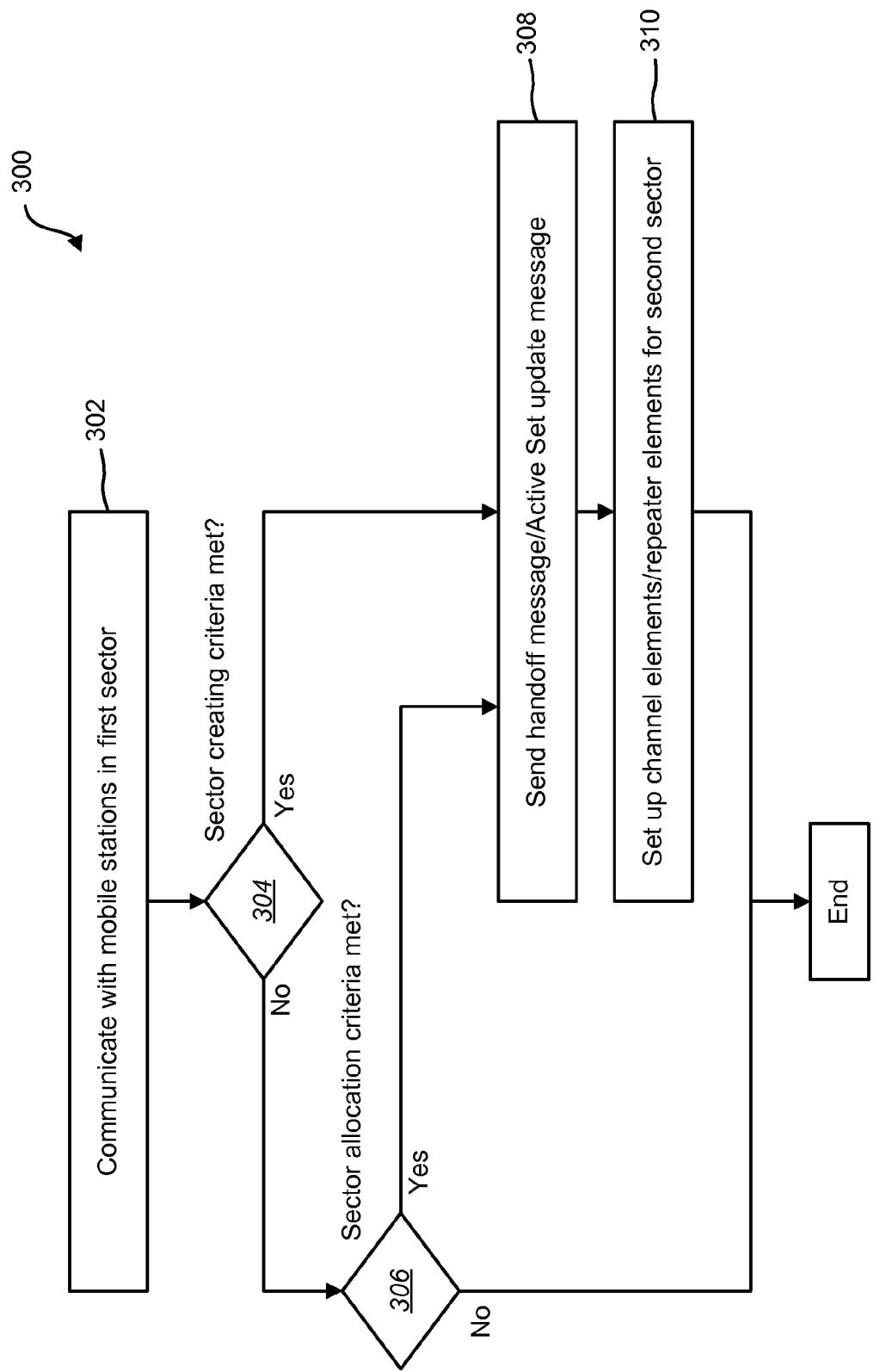
FIG. 3 is a flow diagram of a method for dynamic sector creation/allocation

FIG. 3 is a flow diagram of a method 300 for dynamic sector creation/allocation. The method 300 may be performed by a base station 102. Alternatively, the method 300 may be performed by a base station controller. The base station 102 may communicate 302 with mobile stations 104 in a first sector 108. The base station 102 may determine 304 whether sector creating criteria has been met. For example, the base station 102 may determine whether the current load of the sector 108 within a cell 106 exceeds a loading threshold 226. As another example, the base station 102 may determine whether sector creating criteria has been met by using the sector creating/sector allocating criteria discussed above in relation to FIG. 2 (e.g., number of mobile stations 218, reverse signal power 220, handoff statistics 222, and reverse pilot power 224).

If the cell creating criteria have been met, the base station 102 may send 308 a handoff message/active set update message with a new pilot for a second sector 108 and original pilots for the first sector 108. The handoff message may instruct a mobile station 104 concerning a soft handoff. If the sector creating criteria have not been met, the base station 102 may determine 306 whether sector allocation criteria have been met. For example, the base station 102 may determine whether a donor cell with less load than the current cell 106 is within repeater range. If sector allocation criteria have been met, the base station 102 may send 308 a handoff message with a new pilot for the donor cell and original pilots for the first sector 108 of the first cell 106. Once a handoff message has been sent to the mobile stations 104, the base station 102 may set up 310 the channel elements/repeater elements for the second sector 108. As discussed above, the second sector 108 may be part of the first cell 106 or part of the donor cell. If the sector creating criteria have been met, the base station 102 may set up 310 the channel elements for a second sector 108 within the first sector 108 of the first cell 106. If the cell allocation criteria have been met, the base station 102 may set up 310 repeater elements for a donor cell.

Figure 4:
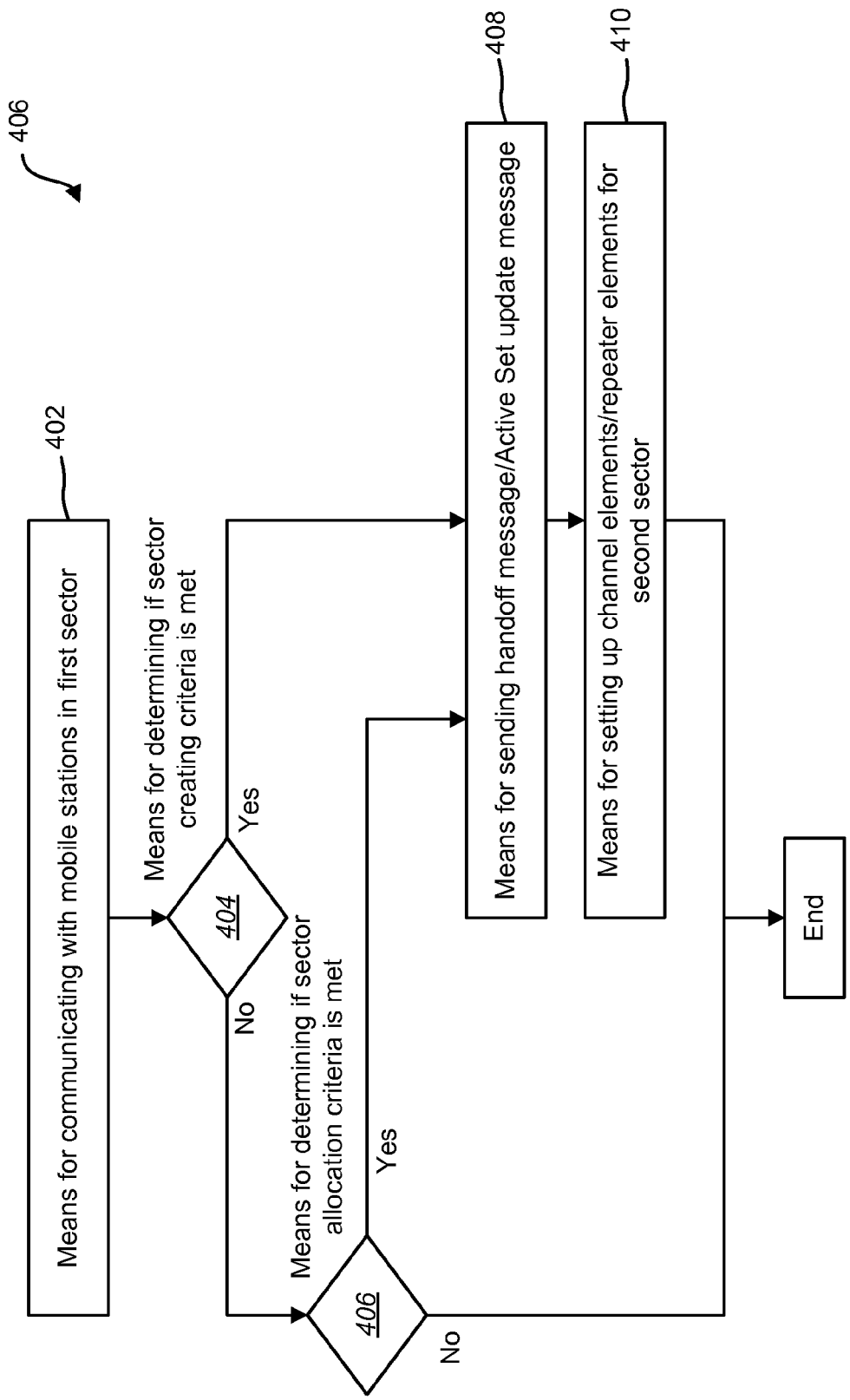
FIG. 4 illustrates means-plus-function blocks corresponding to the method of FIG. 3.

The method 300 of FIG. 3 described above may be performed by various hardware and/or software component(s) and/or module(s) corresponding to the means-plus-function blocks 400 illustrated in FIG. 4. In other words, blocks 302 through 310 illustrated in FIG. 3 correspond to means-plus-function blocks 402 through 410 illustrated in FIG. 4.

Figure 5:
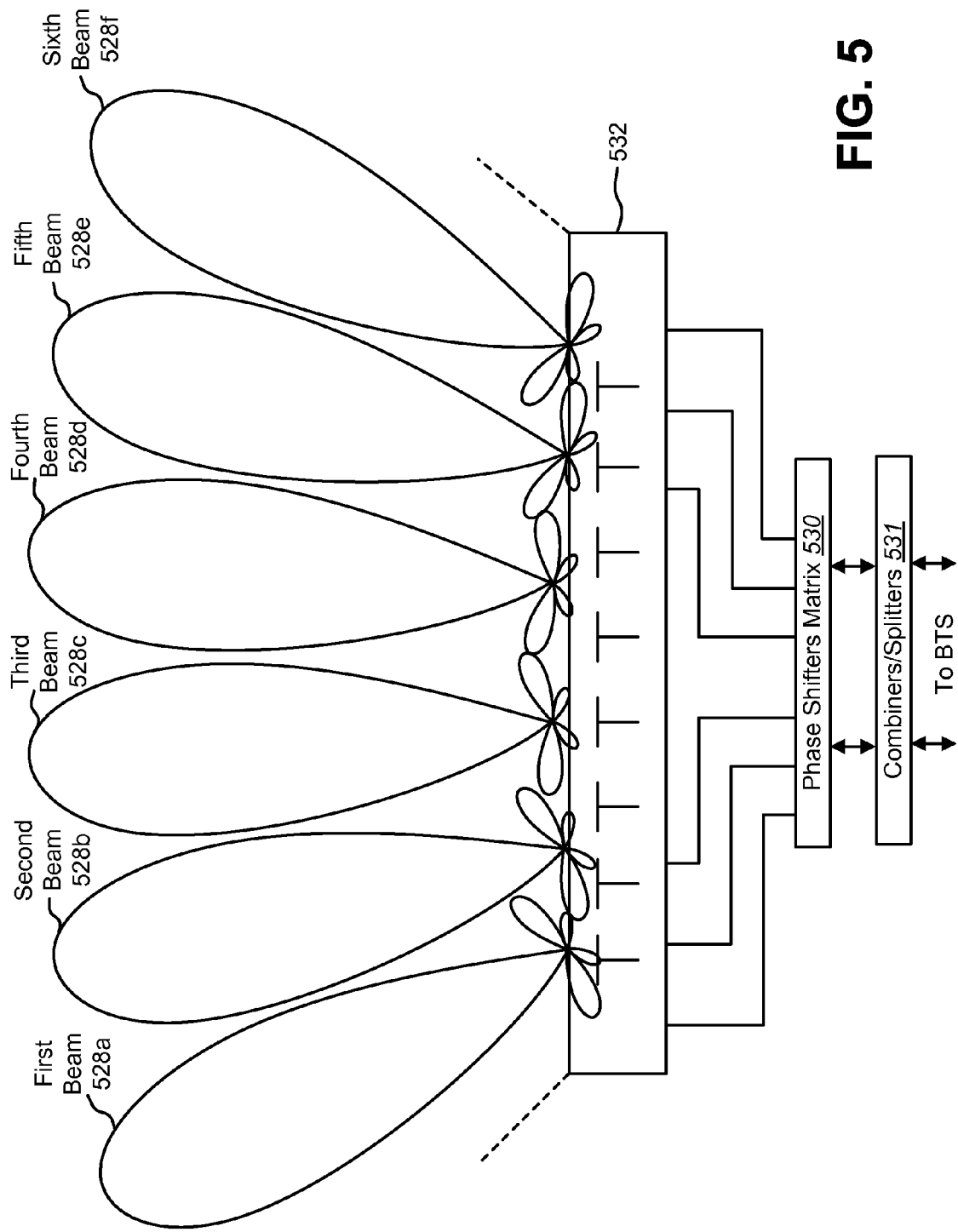
FIG. 5 illustrates multiple beams within a single sector of a cell.

FIG. 5 illustrates multiple beams 528 within a single sector 108 of a cell 106. A cell 106 may represent a geographic area covered by a base station 102. Each base station 102 may be split into one or more sectors 108. For example, a base station 102 may be split into three sectors 108, each sector 108 covering one hundred and twenty (120) degrees around the base station 102. FIG. 5 illustrates one configuration of a sector 108 covering 120 degrees around a base station 102. Each sector 108 may then be covered using one or more narrow beams 528. For example, in FIG. 5, the sector 108 is covered by six beams 528: a first beam 528a, a second beam 528b, a third beam 528c, a fourth beam 528d, a fifth beam 528e, and a sixth beam 528f. The beams 528 may be part of a CDMA sector 108 with a 6-beam antenna 532. Each beam 528 may be formed using a multiple beam antenna 532. Each of the beams 528 is part of the same sector 108 of the cell 106. Thus, each of the beams 528 may use the same pseudo-noise (PN) code when communicating with a mobile station 104. The combined contour line of the beams 528a-f includes the full 120 degree coverage.

Each beam 528 may communicate with a phase shifters matrix 530. Each phase shifter in the phase shifters matrix 530 may be connected to a dipole in the antenna. By adding different phases to different dipoles, the interfered antenna pattern (i.e. multiple beams 528) can be achieved. The phase shifters matrix 530 may be connected to a combiner/splitter unit 531 which is further connected to a base transceiver station (BTS). The phase shifters matrix 530 may be used by the BTS to form each of the beams 528.

The beams 528 may be controlled by the BTS. A BTS is a piece of equipment that facilitates wireless communication between a mobile station 104 and a network. Thus, a BTS may be a base station 102. The BTS may include more than one set of channel elements. In wireless communications, each time a mobile station 104 is in dedicated conversation mode, a hardware unit (such as a channel element) on the base station 102 may be allocated for this dedicated traffic channel to support the conversation. The channel elements may perform the baseband signal processing for a channel. The number of mobile stations 104 in wireless communication with the BTS may determine the load of the BTS. For example, in a low-load mode, the number of mobile stations 104 communicating with the BTS within a sector 108 may be less than a loading threshold 226. The BTS of FIG. 5 is operating in low-load mode, therefore, each of the six beams 528 may be from the same cell 106 and the same sector 108 of the cell 106. In one configuration, each of the beams 528 within a sector 108 may communicate with mobile stations 108 using the same PN code.

Figure 6:
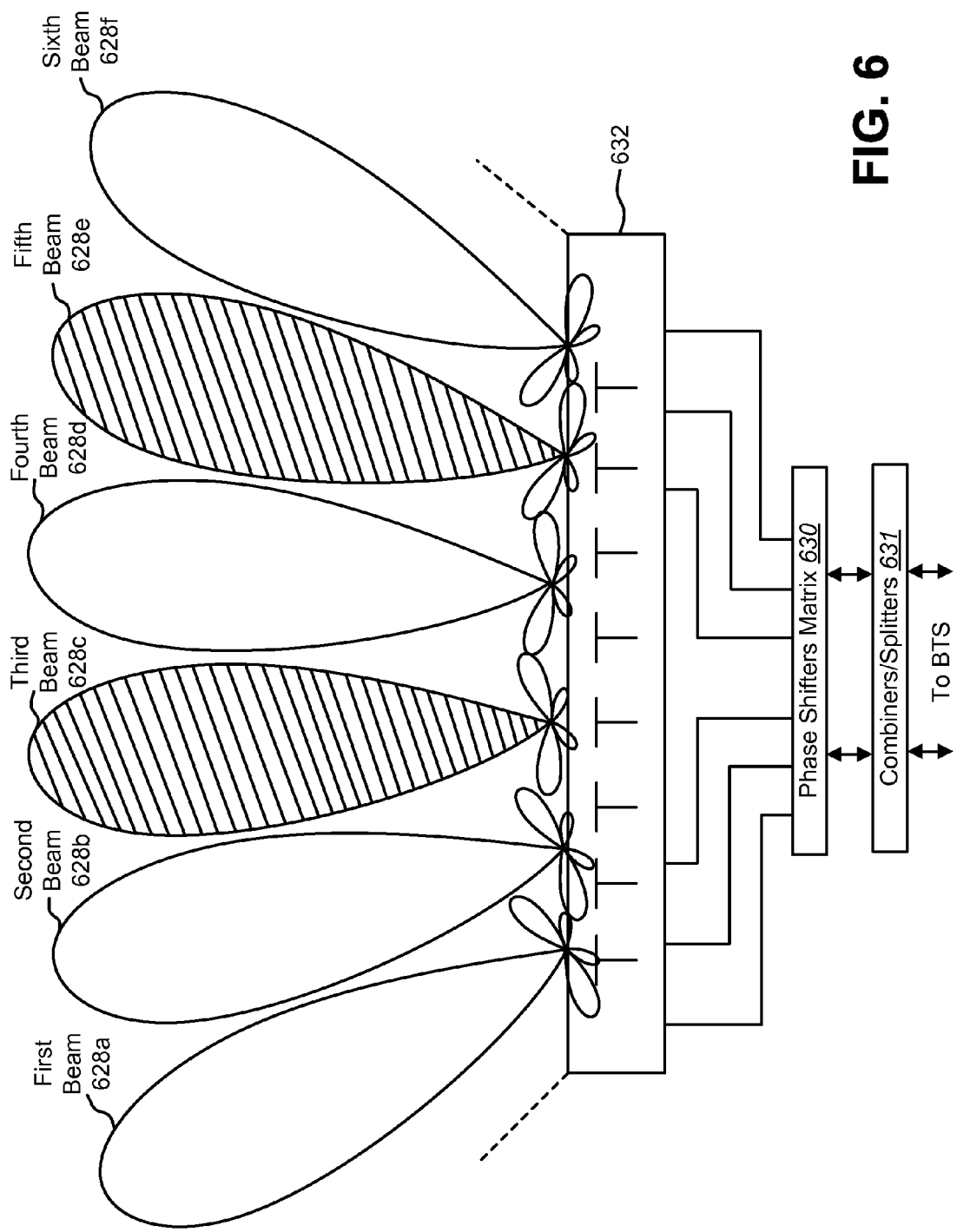
FIG. 6 illustrates multiple beams from a multiple-beam antenna where a second sector has been created within a first sector of a first cell.

FIG. 6 illustrates multiple beams 628 from a multiple-beam antenna 632 where a second sector 114 has been created within a first sector 108a of a first cell 106a. A BTS may send/receive signals through combiners/splitters 631, a phase shifters matrix 630 and then through multiple beams 628. For example, the multiple beam antenna 632 may generate six beams 628. The first beam 628a, second beam 628b, fourth beam 628d and sixth beam 628f may each be part of a first sector 108a. The first sector 108a may use a first PN code.

The third beam 628c and the fifth beam 628e may each be part of a second sector 114. The second sector 114 is a newly created sector. FIG. 1 illustrates that the new sector or second sector 114 may be within the first sector 108a. For example, the second sector 114 may cover part or all of the geographic areas previously covered by the first sector 108a. The second sector 114 may use a second PN code. Thus, mobile stations 104 within the first beam 628a, second beam 628b, fourth beam 628d and sixth beam 628f may communicate with the BTS using the first PN code while mobile stations 104 within the third beam 628c and the fifth beam 628e may communicate with the BTS using the second PN code. To balance the load on a cell 106, the BTS may reallocate some or all of the beams 628 from the first sector 108a to the second sector 114. This may be referred to as sector creation. When a beam is reallocated from the first sector 108a to the second sector 114, the reallocation may be referred to as switching the beam.

Figure 7:
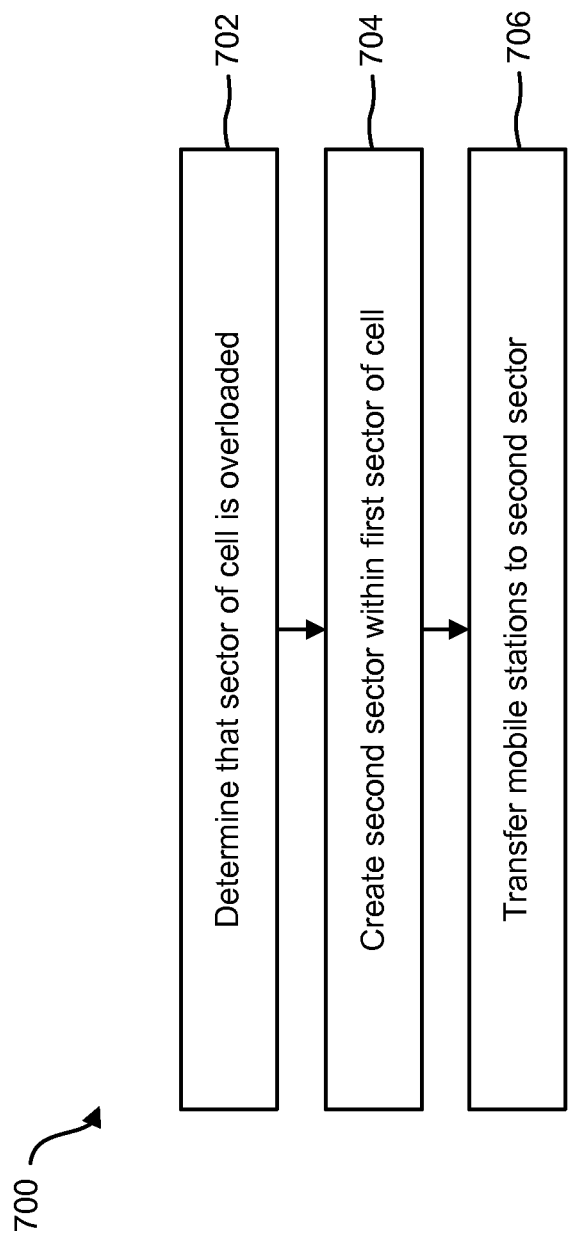
FIG. 7 is a flow diagram of a method for dynamic sector creation.

FIG. 7 is a flow diagram of a method 700 for dynamic sector creation. The method 700 may be performed by a base station 102 or base transceiver station (BTS). The base station 102 may determine 702 that a sector 108a of a cell 106 is overloaded. For example, the base station 102 may determine that the number of mobile stations 104 within a first sector 108a of the cell 106 exceeds a loading threshold 226. The base station 102 may create 704 a second sector 114 within the first sector 108a. Some portions of the first sector 108a may remain in the first sector 108a while other portions of the first sector 108a may become part of a newly created second sector 114. The base station 102 may then transfer 706 the mobile stations 104 within the second sector 114 from communicating with the base station 102 using the communication standards of the first sector 108a to communicating with the base station 102 using the communication standards of the second sector 114. For example, the mobile stations 104 within the first sector 108a may use a first PN code when communicating with the base station 102 and the mobile stations 104 within the second sector 114 may use a second PN code when communicating with the base station 102.

Figure 8:
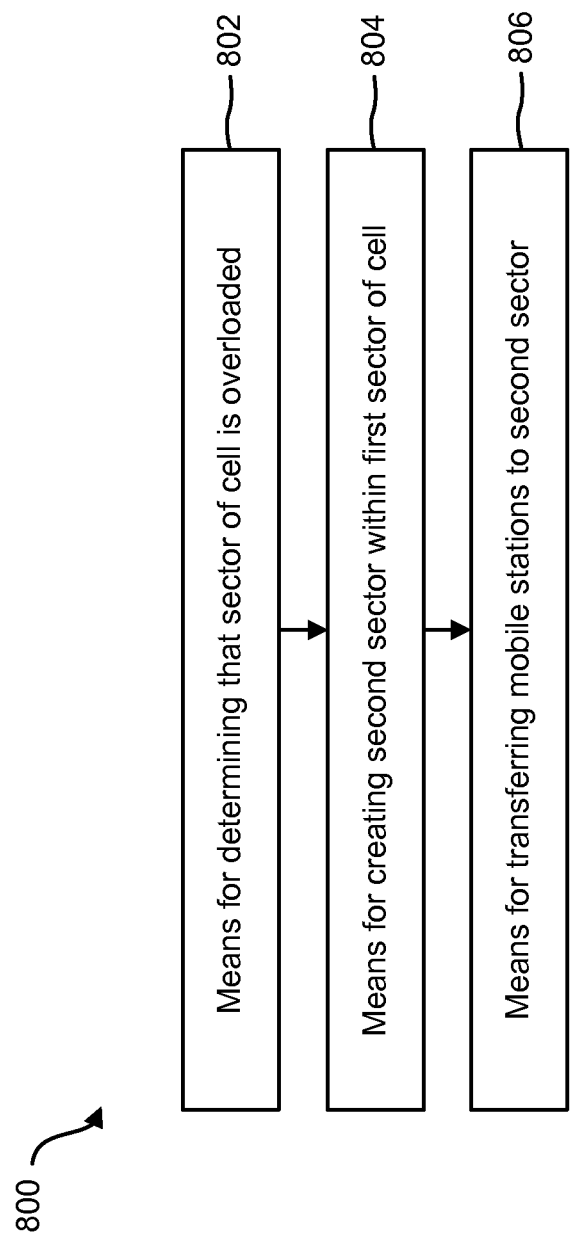
FIG. 8 illustrates means-plus-function blocks corresponding to the method of FIG. 7.

The method 700 of FIG. 7 described above may be performed by various hardware and/or software component(s) and/or module(s) corresponding to the means-plus-function blocks 800 illustrated in FIG. 8. In other words, blocks 702 through 706 illustrated in FIG. 7 correspond to means-plus-function blocks 802 through 806 illustrated in FIG. 8.

Figure 9:
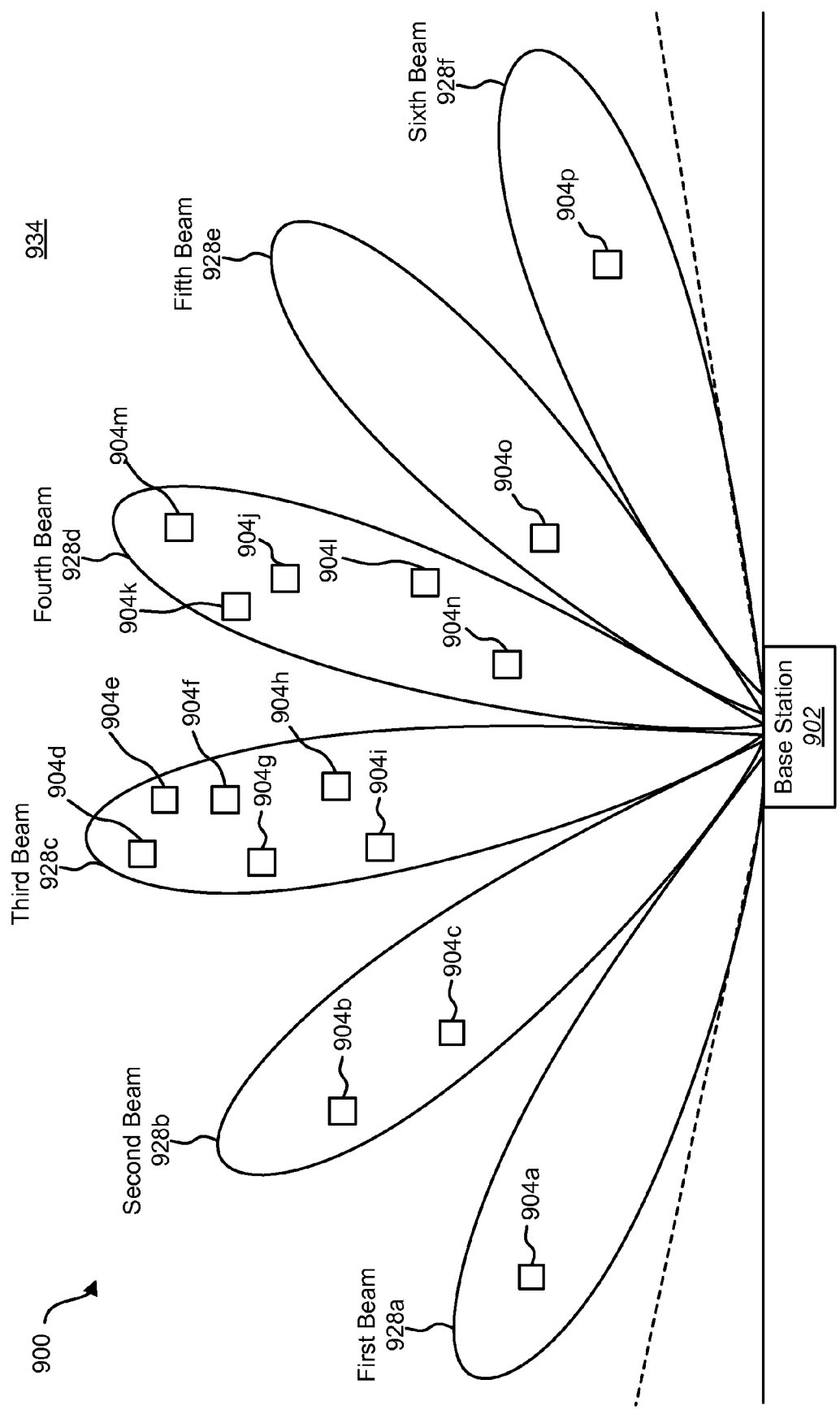
FIG. 9 illustrates a wireless communication system with multiple mobile stations communicating with a base station.

FIG. 9 illustrates a wireless communication system 900 with multiple mobile stations 904a-p communicating with a base station 902. The base station 902 may provide coverage for one sector 934. One sector 934 of the base station 102 is shown. The mobile stations 904 may be located within the sector 934 of the base station 102. Portions of the sector 934 may be covered by various beams 928 generated by a multiple-beam antenna 532. A beam 928 may refer to the radiation pattern from a multiple-beam antenna 532. Each beam 928a-f within the sector 934 may have a beam width of about twenty (20) degrees. The mobile stations 904 in the wireless communication system 900 communicating with the base station 902 may be located within the range of a beam 928. Each mobile station 904 may communicate with the base station 902 using the beam 928 which the mobile station 904 is within the range of The geographic area covered by each beam 928 may be referred to as a beam coverage area. For example, the first beam 928a may cover a first beam coverage area, the second beam 928b may cover a second beam coverage area and the third beam 928c may cover a third beam geographic area, etc. Some beam coverage areas may include more mobile stations 904 than other beam coverage areas. In FIG. 9, the first beam coverage area includes only one mobile station 904a while the third beam coverage area includes six mobile stations 904d-i. All the beams 928 of FIG. 9 are in the same sector 934. The sector 934 of FIG. 9 includes sixteen mobile stations 904 (904a-904p). In one configuration, the sector 934 of FIG. 9 may be overloaded.

Figure 10:
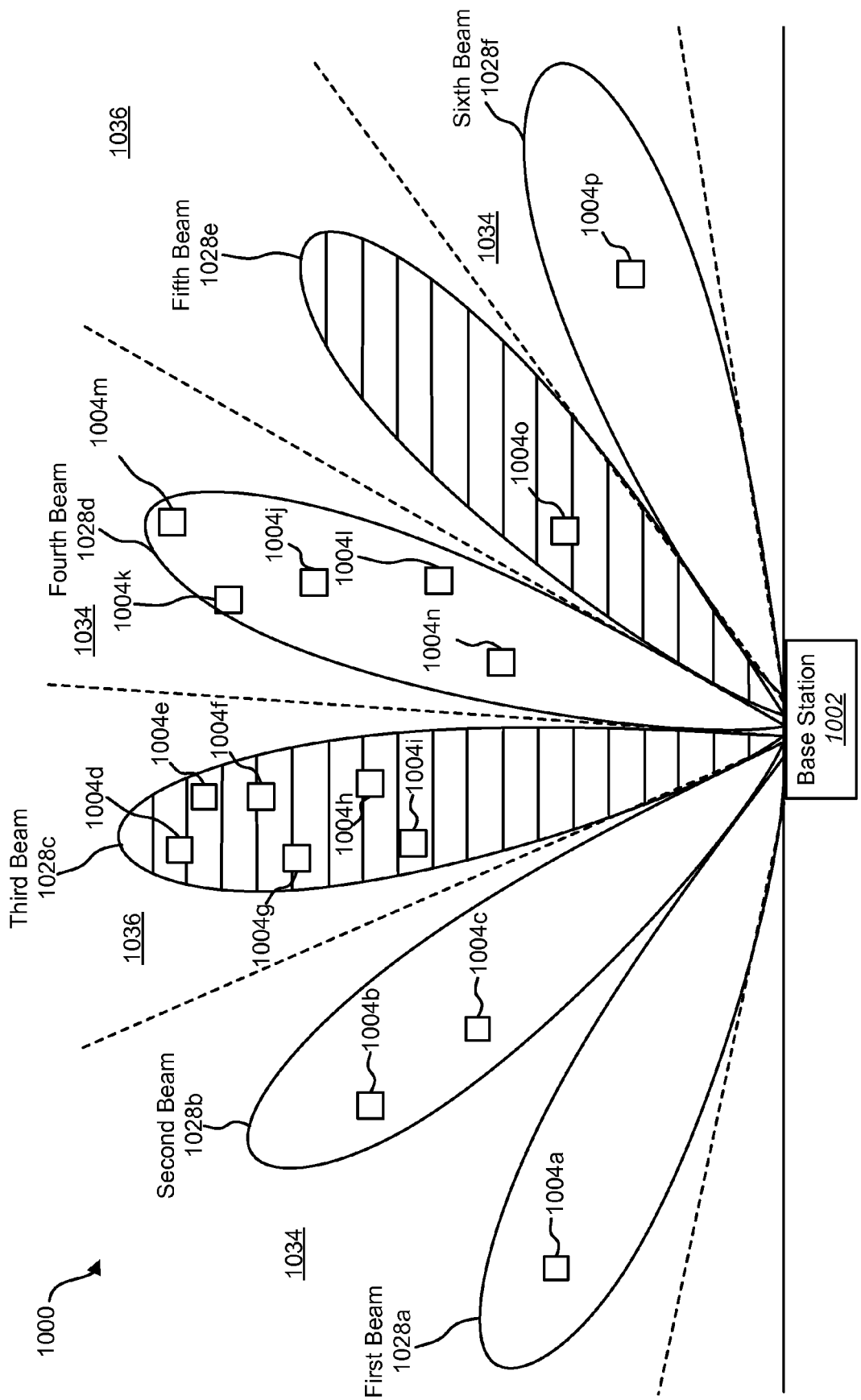
FIG. 10 illustrates a wireless communication system with multiple mobile stations communicating with a base station.

FIG. 10 illustrates a wireless communication system 1000 with multiple mobile stations 1004a-p communicating with a base station 1002. The base station 1002 may provide coverage for multiple sectors 1034, 1036. For example, the base station 1002 may include a first sector 1034. The first sector 1304 of FIG. 10 may be one configuration of the sector 934 of FIG. 9. In the wireless communication system 1000 of FIG. 10, a second sector 1036 has been created using dynamic sector creation. The second sector 1036 may have been created within the areas previously covered by the first sector 1034. For example, the third beam 1028c (and corresponding third coverage area) and the fifth beam 1028e (and corresponding fifth coverage area) are part of the second sector 1036. Thus, the mobile stations 1004 within the third coverage area and the fifth coverage area may be part of the second sector 1036. In contrast, the mobile stations 1004 within the first beam 1028a coverage area, the second beam 1028b coverage area, the fourth beam 1028d coverage area, and the sixth beam 1028f coverage area may still be part of the first sector 1034.

Mobile stations 1004 within the first sector 1034 may communicate with the base station 1002 using a first PN code. Mobile stations 1004 within the second sector 1036 may communicate with the base station 1002 using a second PN code. Thus, the network has sliced the third beam 1028c and the fifth beam 1028e from the first sector 1034 to create a second sector 1036 connected to the new channel elements of the second sector 1036. For example, on the base station 1002, extra channel elements (i.e. hardware modules that support dedicated conversation channels) may be installed and used when the new sector 1036 is created. Also, channel elements previously used in the first sector 1036 can be transferred and reused in the second sector 1038.

Figure 11:
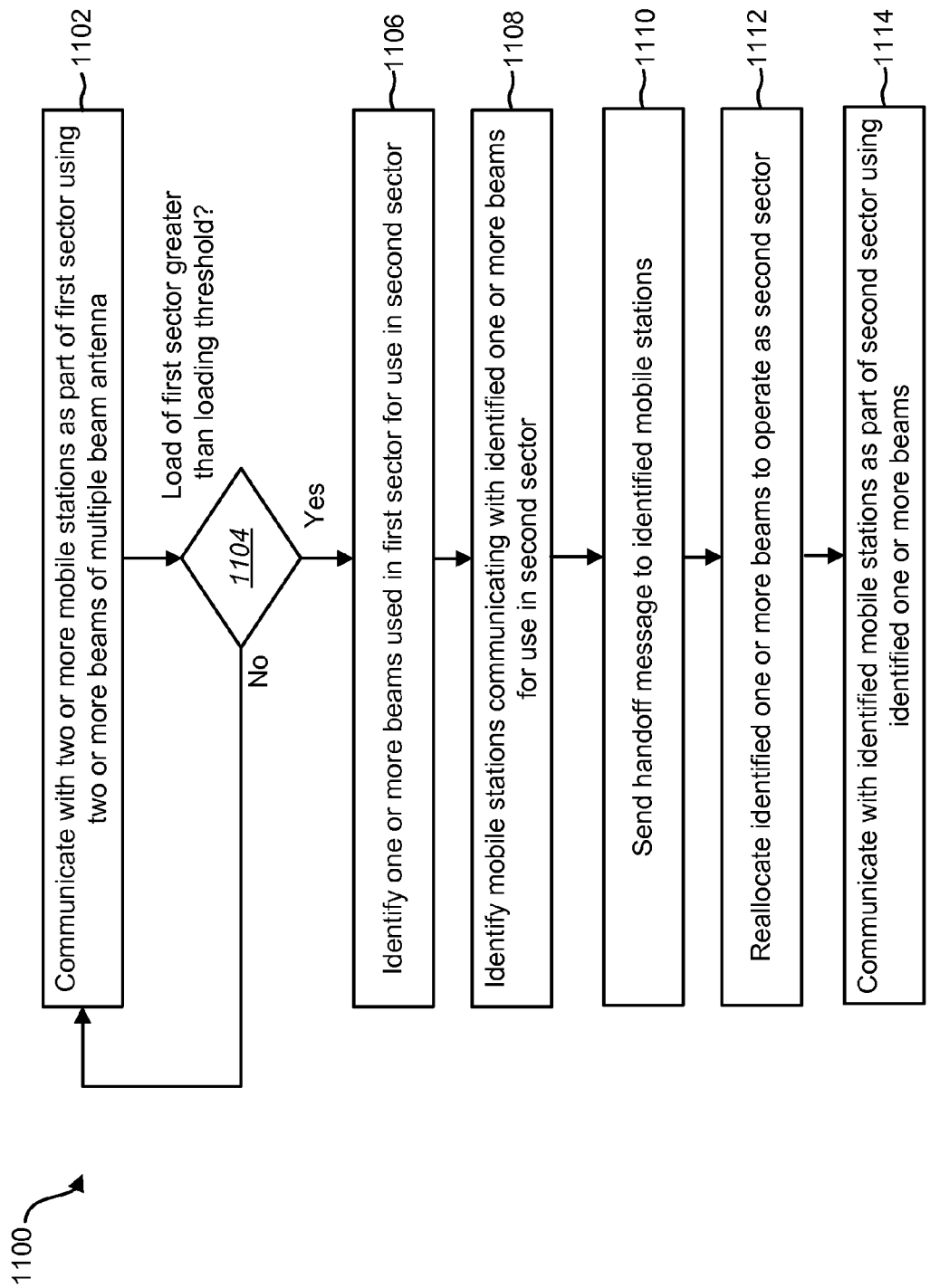
FIG. 11 is a flow diagram of a method for sector creation.

FIG. 11 is a flow diagram of a method 1100 for sector creation. The method 1100 may be performed by a base station 102 or base transceiver station (BTS). The base station 102 may communicate 1102 with two or more mobile stations 104 as part of a first sector 1034 using two or more beams 528 of a multiple beam antenna 532. The base station 102 may then determine 1104 whether the load of the first sector 1034 is greater than a loading threshold 226. If the load of the first sector 1034 is not greater than the loading threshold 226, the base station 102 may continue communicating 1102 with the mobile stations 104 as part of the first sector 1034.

If the load of the first sector 1034 is greater than the loading threshold 226, the base station 102 may identify 1106 one or more beams 1028 used in the first sector 1034 for use in a second sector 1036. For example, the base station 102 may identify one or more beams 1028 used in the first sector 1034 that may be used in the second sector 1036 to produce a balanced or more balanced network. The identifying 1106 of the specific beams to use in the new sector may take into account the loading of each beam. The base station 102 may continuously monitor the loading of each beam 528, as well as all the sectors 108 covered by the base station 102 based on the criterion used in the dynamic sector creation/allocation module 216 (i.e. number of mobile stations 218, sector total voice activity 230). The base station 102 may select to reallocate the beams 1028 to achieve maximum balance of loading after new sector 108 creation. The new sector 108 creation is not limited to two sectors. For example, four sectors 108 may be created. The base station 102 may then identify 1108 the mobile stations 104 which are communicating with the determined one or more beams 1028 for use in the second sector 1036. In other words, the base station 102 may identify which mobile stations need to handoff from the first sector 1034 to the second sector 1036. The base station 102 may send 1110 a handoff message to the identified mobile stations 104. The handoff message may provide instructions for the mobile stations 104 to handoff from the first sector 1034 to the second sector 1036. In one configuration, the handoff message may be a universal handoff direction message (UHDM), extended handoff direction message or Active Set Update message.

A handoff message with both the original PN code and a new PN code may be used to initially put a mobile station 104 into a soft handoff condition until the second sector 1036 is fully set up or created. During the temporary soft handoff period, a mobile station 104 may receive frames with both PN codes. Most likely, the frames with the new PN code will be corrupted until the new sector 1036 is fully functional. Since the mobile station 104 is in soft handoff, one good pilot with valid frames may be sufficient for the communication to be maintained.

The base station 102 may then reallocate 1112 the identified one or more beams 1028 to operate as the second sector 1036. The identified one or more beams 1028 may be reallocated 1112 to operate as the second sector 1036 by changing the PN codes and/or pilot signals used by the beams 1028 when communicating with mobile stations 104. The base station 102 may then communicate 1114 with the identified mobile stations 104 as part of the second sector 1036 using the identified one or more beams 1028.

Figure 12:
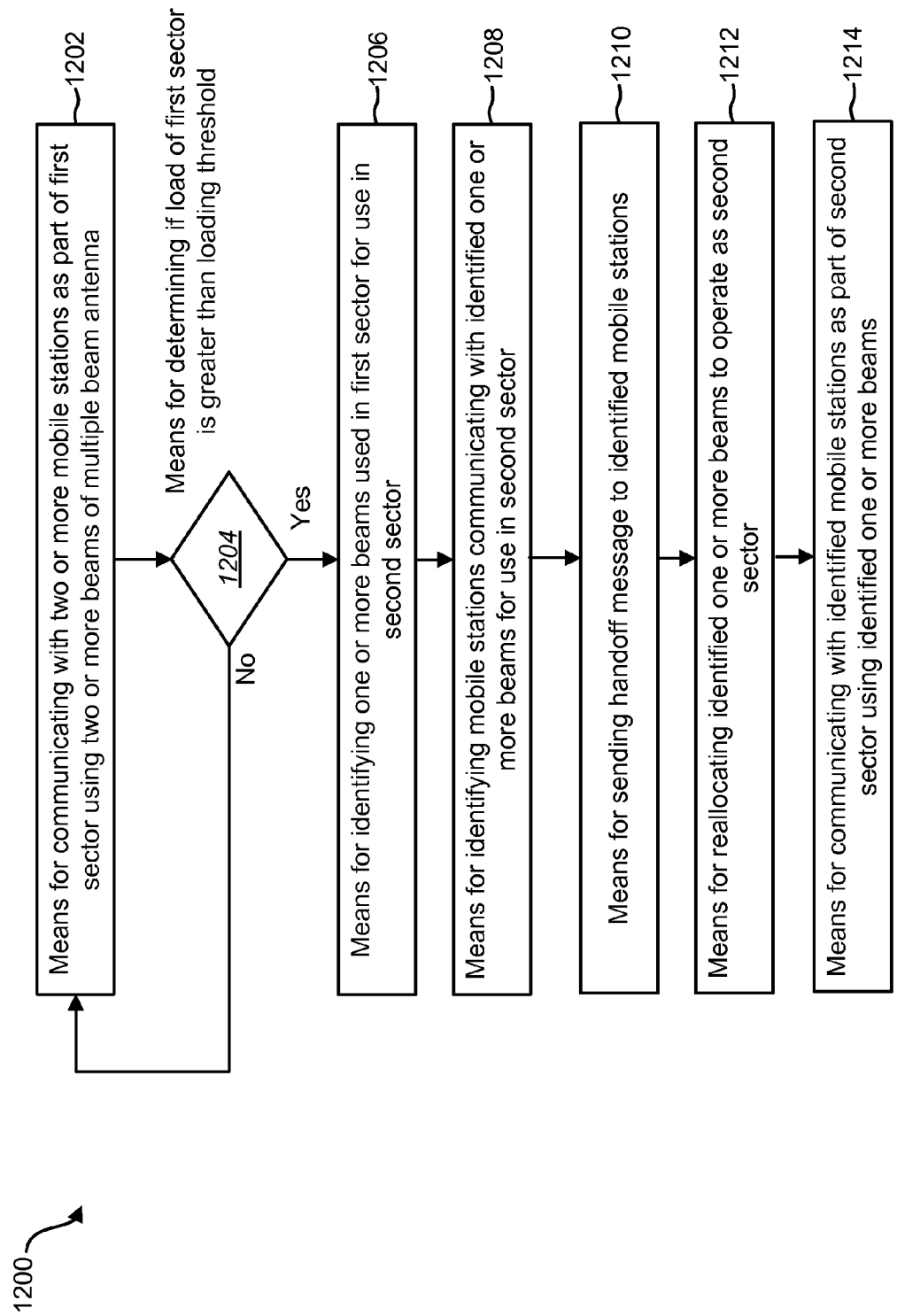
FIG. 12 illustrates means-plus-function blocks corresponding to the method of FIG. 11.

The method 1100 of FIG. 11 described above may be performed by various hardware and/or software component(s) and/or module(s) corresponding to the means-plus-function blocks 1200 illustrated in FIG. 12. In other words, blocks 1102 through 1114 illustrated in FIG. 11 correspond to means-plus-function blocks 1202 through 1214 illustrated in FIG. 12.

Figure 13:
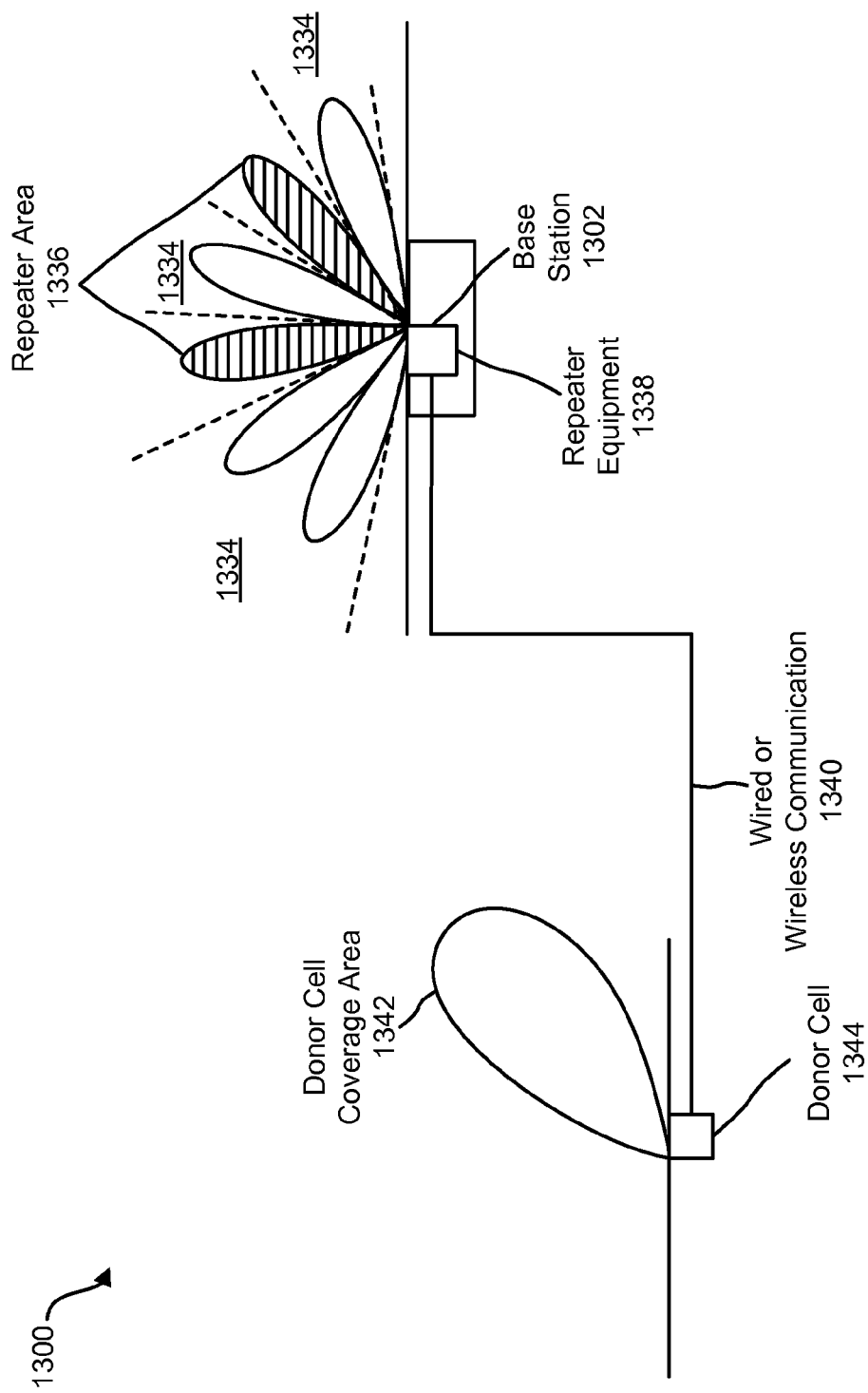
FIG. 13 illustrates a wireless communication system with multiple cells.

FIG. 13 illustrates a wireless communication system 1300 with multiple cells. A base station 1302 sector may provide coverage for a first cell. The base station 1302 may include repeater equipment 1338. The base station 1302 and first cell of FIG. 13 may be one configuration of the base station 902 and cell of FIG. 9. For example, FIG. 13 may illustrate the base station 902 and cell of FIG. 9 after dynamic sector creation/allocation.

The base station 1302 sector may include a multiple-beam antenna 532. The multiple-beam antenna 532 may generate a first beam 528a, a second beam 528b, a third beam 528c, a fourth beam 528d, a fifth beam 528e and a sixth beam 528f. The first cell may include a first sector 1334 and a second sector 1336. The original sector 1334 may provide coverage of the first sector 1334 using the first beam 528*a*, the second beam 528*b*, the fourth beam 528*d* and the sixth beam 528*f*. The base station 1302 may provide coverage of the second sector 1336 using the third beam 528*c* and the fifth beam 528*e*. The base station 1302 may provide coverage of the second sector 1336 by dynamically allocating the second sector 1336 to a donor cell 1344. The donor cell 1344 may be within repeater range of the base station 1302. The second sector 1336 may be referred to and illustrated as the repeater area 1336 in FIG. 13.

The base station 1302 sector may dynamically allocate the second sector 1336 or the repeater area 1336 to the donor cell 1344 by splicing and combining one or more beams 528 of the original sector 1334 to create the second sector 1336. The base station 1302 may then allocate the one or more beams 528 of the second sector 1336 to serve as the repeater area 1336 of the donor cell 1344. The base station 1302 may use the repeater equipment 1338 to allow the donor cell 1344 to handle the serving of mobile stations 104 within the second sector 1336. The repeater equipment 1338 may communicate with the donor cell 1344 using wired or wireless communication 1340. In this way, all the mobile stations 104 served by the beams 528 of the newly created second sector 1336 may be handled by the donor cell 1344. The donor cell 1344 may have less load than the base station 1302. For example, the donor cell 1344 may have less mobile stations 104 within the donor cell coverage area 1342 than the base station 1302 has. Thus, use of the donor cell 1344 may balance the load of the network.

Figure 14:
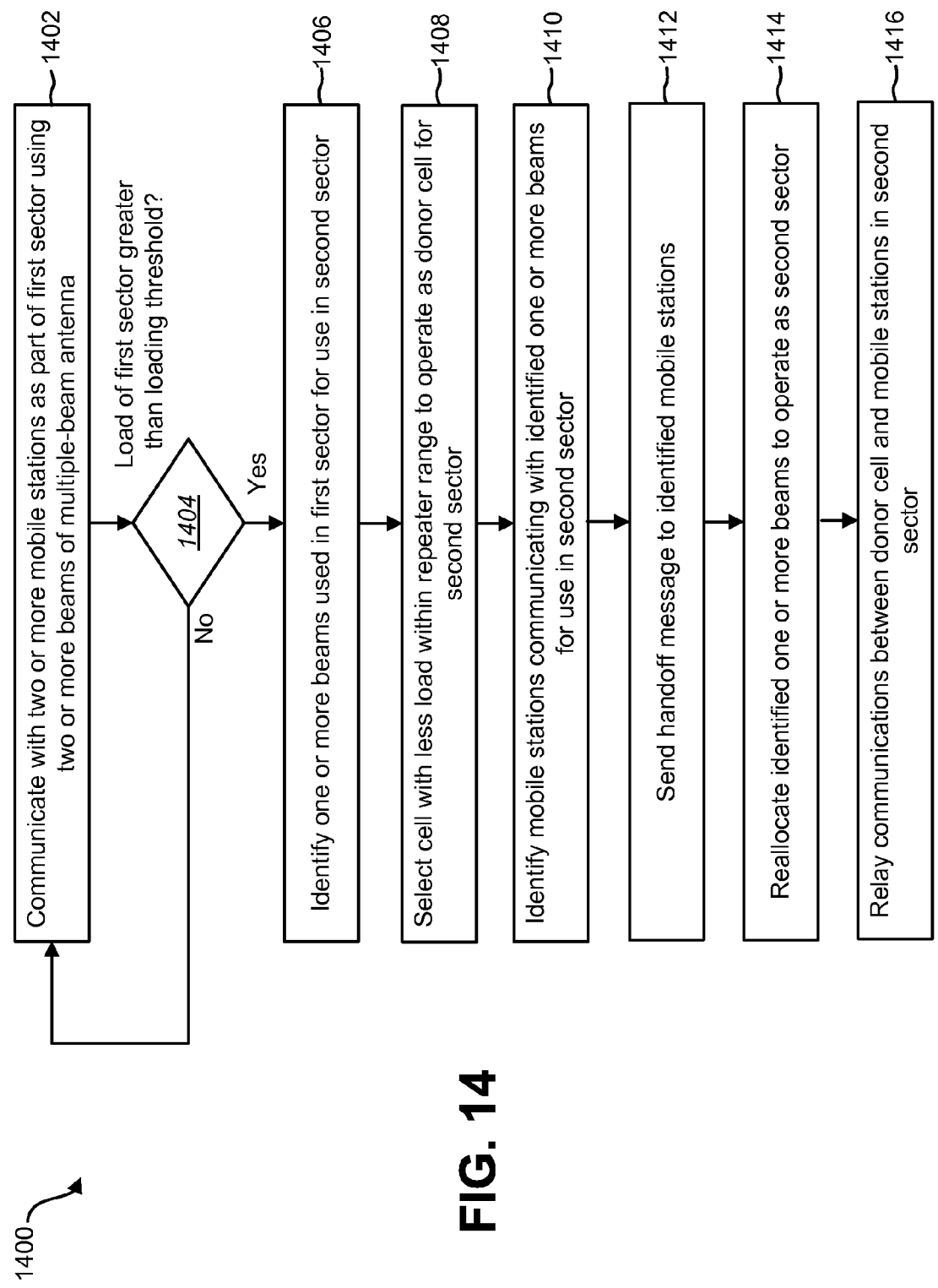
FIG. 14 is a flow diagram of a method for dynamic sector allocation.

FIG. 14 is a flow diagram of a method 1400 for dynamic sector allocation. The method 1400 may be performed by a base station 1302. The base station 1302 may communicate 1402 with two or more mobile stations 104 as part of a first sector 1334 using two or more beams 528 of a multiple-beam antenna 532. The base station 1302 may determine 1404 whether the load of the first sector 1334 is greater than a loading threshold 226. If the load of the first sector 1034 is not greater than the loading threshold 226, the base station 1302 may continue communicating 1402 with the mobile stations 104 as part of a first sector 1334.

If the load of the first sector 1334 is greater than the loading threshold 226, the base station 1302 may identify 1406 one or more beams 528 used in the first sector 1334 for use in a second sector 1336. The base station 1302 may then select 1408 a cell with less load within repeater range to operate as a donor cell 1344 for the second sector 1336. The base station 1302 may then identify 1410 the mobile stations 104 which are communicating with the identified one or more beams 528 for use in the second sector 1336. In other words, the base station 1302 may identify 1410 which mobile stations 104 need to handoff from the first sector 1334 to the second sector 1336. The base station 104 may send 1412 a handoff message to the identified mobile stations 104. The handoff message may provide instructions for the mobile stations 104 to handoff from the first sector 1334 to the second sector 1336. In one configuration, the handoff message may be a universal handoff direction message (UHDM).

A handoff message with both the original PN code and the new PN code may be used to initially put a mobile station 104 into a soft handoff condition until the mobile station 104 sets up a stable link with the donor cell 1344. During the temporary soft handoff period, a mobile station 104 may receive frames with both PN codes. Since the mobile station 104 is in soft handoff, one good pilot with valid frames may be sufficient for the communication to be maintained.

The base station 1302 may then reallocate 1414 the identified one or more beams 528 to operate as the second sector 1336. The identified one or more beams 528 may be reallocated 1414 to operate as the second sector 1336 by changing the PN codes and/or pilot signals used by the beams 528 when communicating with mobile stations 104. The base station 1302 may then relay 1416 communications between the donor cell and the identified mobile stations 104 as part of the second sector 1334 using the identified one or more beams 528.

Figure 15:
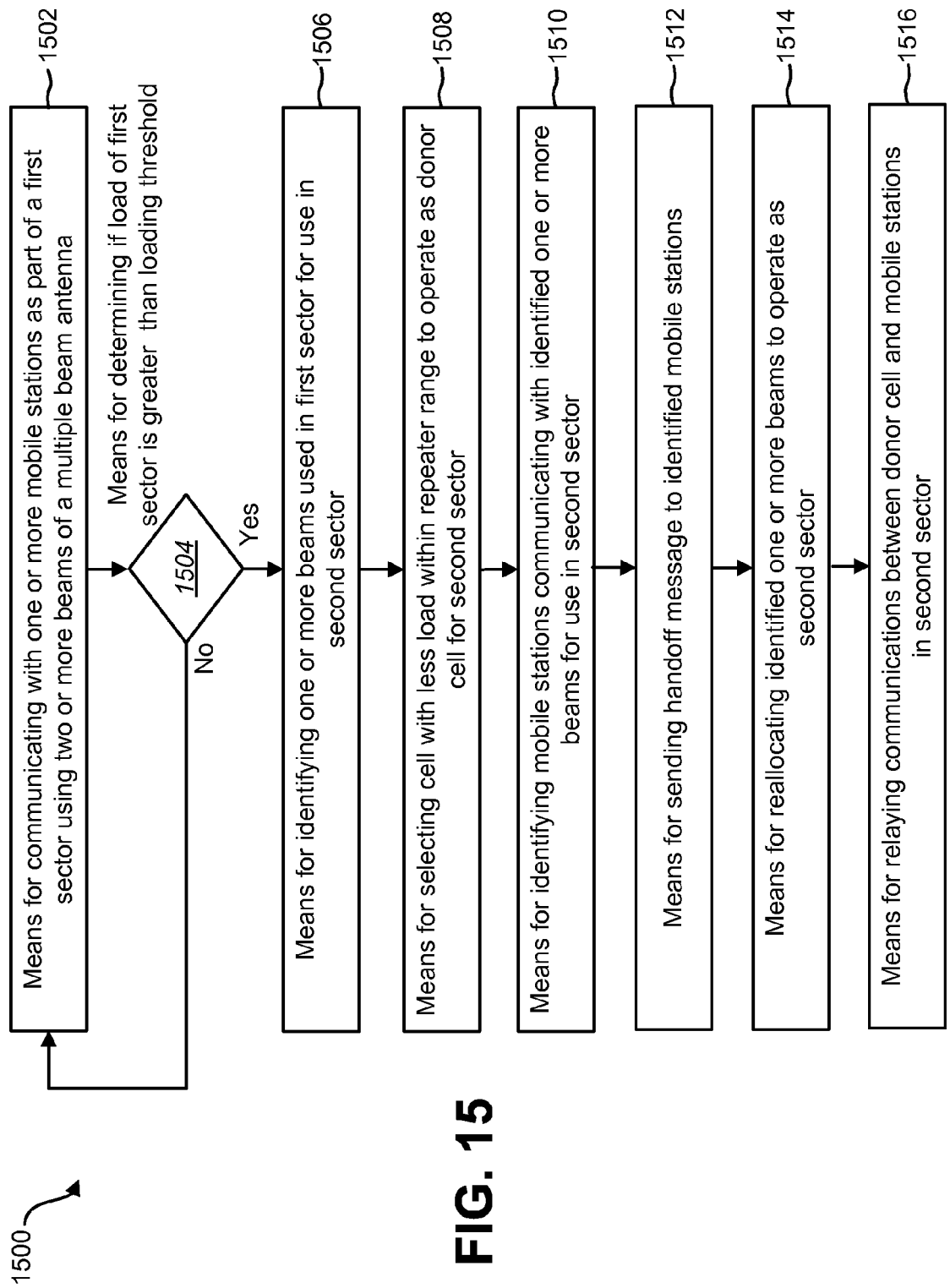
FIG. 15 illustrates means-plus-function blocks corresponding to the method of FIG. 14.

The method 1400 of FIG. 14 described above may be performed by various hardware and/or software component(s) and/or module(s) corresponding to the means-plus-function blocks 1500 illustrated in FIG. 15. In other words, blocks 1402 through 1416 illustrated in FIG. 14 correspond to means-plus-function blocks 1502 through 1516 illustrated in FIG. 15.

Figure 16:
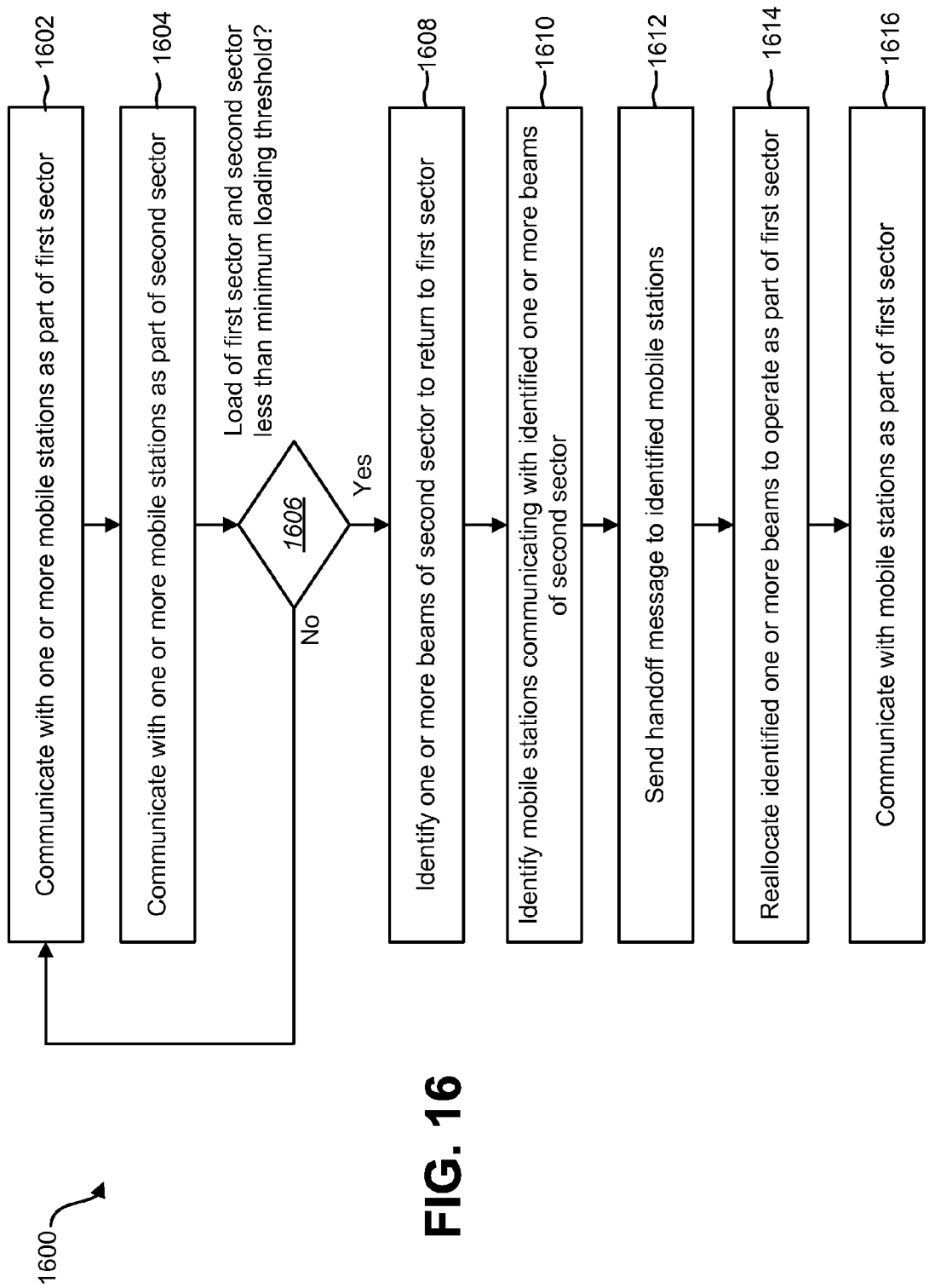
FIG. 16 is a flow diagram of a method for sector deletion.

FIG. 16 is a flow diagram of a method 1600 for sector 108 deletion. The method 1600 may be performed by one or more base stations 102. In one configuration, the method 1600 may be performed by a base station controller or base transceiver station (BTS). A base station 102 may communicate 1602 with one or more mobile stations 104 as part of a first sector 1034 (illustrated in FIG. 10). The base station 102 may also communicate 1604 with one or more mobile stations 104 as part of a second sector 1036. In one configuration, the base station 102 may act as a relay between the one or more mobile stations 104 which are part of the second sector 1036 and a donor cell 1344. In another configuration, the base station 102 may be covering both sectors 1034, 1036.

The base station 102 may determine 1606 if the load of the first sector 1034 and the second sector 1036 is less than a minimum loading threshold 227. If the load of the first sector 1034 and the second sector 1036 is not less than the minimum loading threshold 227, the base station 102 may continue communicating 1602, 1604 with the one or more mobile stations 104 as part of the first sector 1034 and the one or more mobile stations 104 as part of the second sector 1036.

If the load of the first sector 1034 and the second sector 1036 is less than the minimum loading threshold 227, the base station 102 may identify 1608 one or more beams 528 of the second sector 1036 to return to the first sector 1034. The base station 102 may then identify 1610 the mobile stations 104 communicating with the identified one or more beams 528 of the second sector 1036. The base station 102 may next send 1612 a handoff message to the identified mobile stations 104. The base station 102 may reallocate 1614 the identified one or more beams 528 to operate as part of the first sector 1034 and start communicating 1616 with the mobile stations 104 as part of the first sector 1034. Thus, in one configuration the method shown in FIG. 16 may be used to return beams that have been switched to sectors that have been created and/or allocated back to their original sectors. The beams may also be reallocated to other sectors as well that may not be the original sectors.

Figure 17:
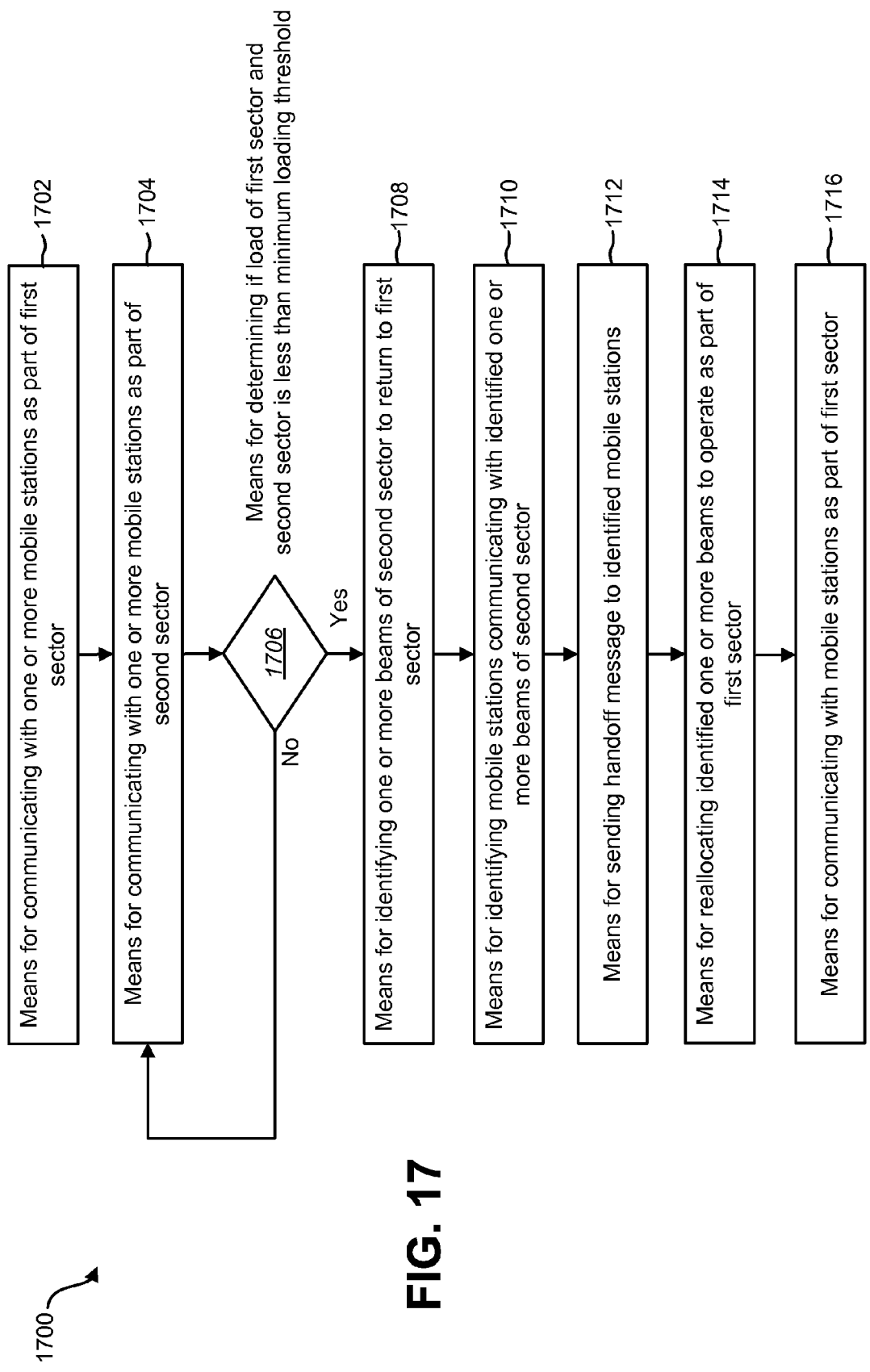
FIG. 17 illustrates means-plus-function blocks corresponding to the method of FIG. 16.

The method 1600 of FIG. 16 described above may be performed by various hardware and/or software component(s) and/or module(s) corresponding to the means-plus-function blocks 1700 illustrated in FIG. 17. In other words, blocks 1602 through 1616 illustrated in FIG. 16 correspond to means-plus-function blocks 1702 through 1716 illustrated in FIG. 17.

Figure 18:
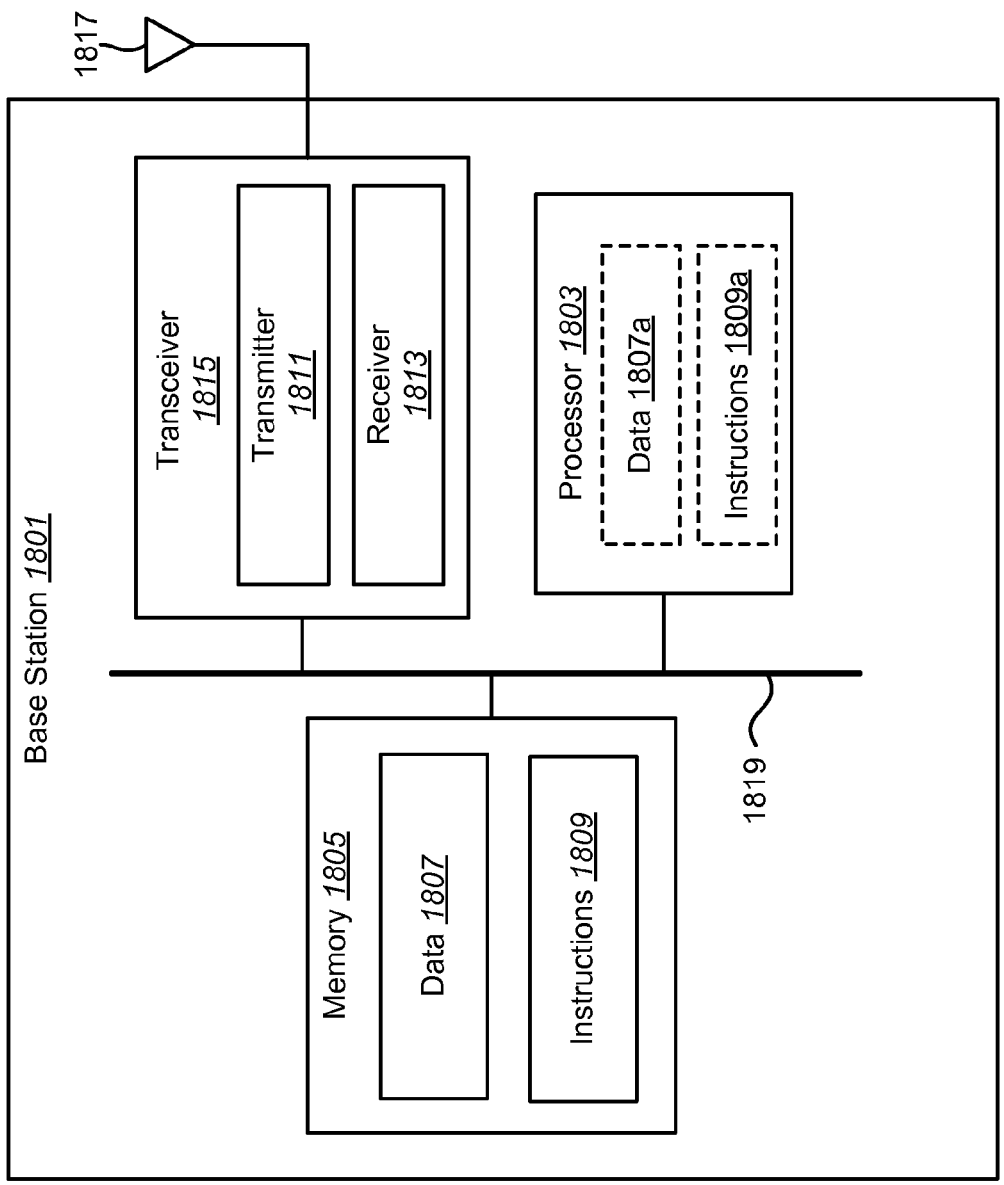
FIG. 18 illustrates certain components that may be included within a base station.

FIG. 18 illustrates certain components that may be included within a base station 1801. The base station 1801 includes a processor 1803. The processor 1803 may be a general purpose single- or multi-chip microprocessor (e.g., an ARM), a special purpose microprocessor (e.g., a digital signal processor (DSP)), a microcontroller, a programmable gate array, etc. The processor 1803 may be referred to as a central processing unit (CPU). Although just a single processor 1803 is shown in the base station 1801 of FIG. 18, in an alternative configuration, a combination of processors (e.g., an ARM and DSP) could be used.

The base station 1801 also includes memory 1805. The memory 1805 may be any electronic component capable of storing electronic information. The memory 1805 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1807 and instructions 1809 may be stored in the memory 1805. The instructions 1809 may be executable by the processor 1803 to implement the methods disclosed herein. Executing the instructions 1809 may involve the use of the data 1807 that is stored in the memory 1805. When the processor 1803 executes the instructions 1807, various portions of the instructions 1809a may be loaded onto the processor 1803, and various pieces of data 1807a may be loaded onto the processor 1803.

The base station 1801 may also include a transmitter 1811 and a receiver 1813 to allow transmission and reception of signals to and from the base station 1801. The transmitter 1811 and receiver 1813 may be collectively referred to as a transceiver 1815. An antenna 1817 may be electrically coupled to the transceiver 1815. The base station 1801 may also include (not shown) multiple transmitters, multiple receivers, multiple transceivers and/or multiple antenna.

The various components of the base station 1801 may be coupled together by one or more buses, which may include a power bus, a control signal bus, a status signal bus, a data bus, etc. For the sake of clarity, the various buses are illustrated in FIG. 18 as a bus system 1819.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in hardware, software, firmware, or any combination thereof If implemented in software, the functions may be stored as one or more instructions on a computer-readable medium. The terms "computer-readable medium" or "computer-program product" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 3, 7, 11, 14 and 16, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for dynamic sector creation, comprising:
   determining that a first sector of a cell is overloaded, wherein the first sector uses a first pseudo noise (PN) code;
   upon determining that the first sector of the cell is overloaded, creating a second sector of the cell within the first sector, wherein the second sector uses a second PN code that is different from the first PN code; and
   transferring one or more mobile stations from the first sector to the second sector,
   wherein determining that the first sector of the cell is overloaded comprises comparing the load of the first sector with a loading threshold, wherein the first sector is overloaded if the load of the first sector is greater than the loading threshold.

2. The method of claim 1, wherein determining that the first sector of the cell is overloaded comprises comparing the load of the first sector with a loading threshold, wherein the first sector is overloaded if the load of the first sector is greater than the loading threshold.

3. The method of claim 1, further comprising:
   communicating with two or more mobile stations as part of the first sector using a multiple beam antenna;
   identifying one or more beams of the multiple beam antenna to use in the second sector;
   identifying one or more mobile stations communicating with the identified one or more beams for use in the second sector; and
   sending a handoff message to the one or more mobile stations.

4. The method of claim 3, further comprising reallocating the one or more beams to operate as the second sector.

5. The method of claim 4, further comprising communicating with the identified one or more mobile stations as part of the second sector using the reallocated one or more beams.

6. The method of claim 4, further comprising allocating resources from a donor cell, wherein allocating resources from a donor cell comprises:
   selecting a cell with less load within repeater range to operate as the donor cell for the second sector; and
   relaying communications between the donor cell and mobile stations in the second sector.

7. The method of claim 4, wherein communicating with two or more mobile stations as part of the first sector comprises using the first pseudo noise (PN) code, and wherein reallocating the one or more beams to operate as the second sector comprises using the second PN code by the one or more beams to operate as the second sector.

8. The method of claim 1, wherein the method is performed by a base station.

9. The method of claim 3, wherein the handoff message is selected from the group consisting of a universal handoff direction message (UHDM), an extended handoff direction message and an active set update message.

10. The method of claim 2, wherein the loading threshold is based on at least one of the following: a number of mobile stations, a reverse signal power, handoff statistics, a reverse pilot report, sector noise floor and sector voice activity in a sector.

11. The method of claim 1, further comprising:
    communicating with one or more mobile stations as part of the first sector;
    communicating with one or more mobile stations as part of the second sector;
    transferring one or more mobile stations from the second sector to the first sector; and
    removing the second sector.

12. The method of claim 11, further comprising comparing a load of the first sector and second sector with a minimum loading threshold, and identifying one or more beams of the second sector to return to the first sector if the load is less than the minimum loading threshold.

13. The method of claim 12, further comprising identifying the mobile stations communicating with the identified one or more beams of the second sector.

14. The method of claim 13, wherein removing the second sector comprises combining the identified one or more beams to operate as part of the first sector.

15. A base station configured for dynamic sector creation comprising:
    a processor;
    memory in electronic communication with the processor;
    instructions stored in the memory, the instructions being executable by the processor to:
    determine that a first sector of a cell is overloaded, wherein the first sector uses a first pseudo noise (PN) code;
    upon determining that the first sector of the cell is overloaded, create a second sector of the cell within the first sector, wherein the second sector uses a second PN code that is different from the first PN code; and
    transfer one or more mobile stations from the first sector to the second sector,
    wherein determining that the first sector of the cell is overloaded comprises comparing the load of the first sector with a loading threshold, wherein the first sector is overloaded if the load of the first sector is greater than the loading threshold.

16. The base station of claim 15, wherein determining that the first sector of the cell is overloaded comprises comparing the load of the first sector with a loading threshold, wherein the first sector is overloaded if the load of the first sector is greater than the loading threshold.

17. The base station of claim 15, wherein the instructions are further executable to:
    communicate with two or more mobile stations as part of the first sector using a multiple beam antenna;
    identify one or more beams of the multiple beam antenna to use in the second sector;
    identify one or more mobile stations communicating with the identified one or more beams for use in the second sector; and
    send a handoff message to the one or more mobile stations.

18. The base station of claim 17, wherein the instructions are further executable to reallocate the one or more beams to operate as the second sector.

19. The base station of claim 18, wherein the instructions are further executable to communicate with the identified one or more mobile stations as part of the second sector using the reallocated one or more beams.

20. The base station of claim 18, wherein the instructions are further executable to allocate resources from a donor cell, wherein allocating resources from a donor cell comprises:
    selecting a cell with less load within repeater range to operate as a donor cell for the second sector; and
    relaying communications between the donor cell and mobile stations in the second sector.

21. The base station of claim 18, wherein communicating with two or more mobile stations as part of the first sector comprises using the first pseudo noise (PN) code, and wherein reallocating the one or more beams to operate as the second sector comprises using the second PN code by the one or more beams to operate as the second sector.

22. The base station of claim 17, wherein the handoff message is selected from the group consisting of a universal handoff direction message (UHDM), an extended handoff direction message and an active set update message.

23. The base station of claim 16, wherein the loading threshold is based on at least one of the following: a number of mobile stations, a reverse signal power, handoff statistics, a reverse pilot report, sector noise floor and sector voice activity in a sector.

24. The base station of claim 15, wherein the instructions are further executable to:
communicate with one or more mobile stations as part of the first sector;
communicate with one or more mobile stations as part of the second sector;
transfer one or more mobile stations from the second sector to the first sector; and
remove the second sector.

25. The base station of claim 24, wherein the instructions are further executable to compare a load of the first sector and second sector with a minimum loading threshold, and identify one or more beams of the second sector to return to the first sector if the load is less than the minimum loading threshold.

26. The base station of claim 25, wherein the instructions are further executable to identify the mobile stations communicating with the identified one or more beams of the second sector.

27. The base station of claim 26, wherein removing the second sector comprises combining the identified one or more beams to operate as part of the first sector.

28. An apparatus for dynamic sector creation, comprising:
means for determining that a first sector of a cell is overloaded, wherein the first sector uses a first pseudo noise (PN) code;
means for, upon determining that the first sector of the cell is overloaded, creating a second sector of the cell within the first sector, wherein the second sector uses a second PN code that is different from the first PN code; and
means for transferring one or more mobile stations from the first sector to the second sector,
wherein determining that the first sector of the cell is overloaded comprises comparing the load of the first sector with a loading threshold, wherein the first sector is overloaded if the load of the first sector is greater than the loading threshold.

29. A non-transitory computer-program product for a wireless device configured for dynamic sector creation, the computer-program product comprising a non-transitory computer-readable storage medium having instructions thereon, the instructions comprising:
code for determining that a first sector of a cell is overloaded, wherein the first sector uses a first pseudo noise (PN) code;
code for, upon determining that the first sector of the cell is overloaded, creating a second sector of the cell within the first sector, wherein the second sector uses a second PN code that is different from the first PN code; and
code for transferring one or more mobile stations from the first sector to the second sector,
wherein determining that the first sector of the cell is overloaded comprises comparing the load of the first sector with a loading threshold, wherein the first sector is overloaded if the load of the first sector is greater than the loading threshold.

30. An apparatus for dynamic sector allocation, comprising:
means for determining that a first sector of a cell is overloaded, wherein the first sector uses a first pseudo noise (PN) code;
means for, upon determining that the first sector of the cell is overloaded, creating a second sector of the cell within the first sector, wherein the second sector uses a second PN code that is different from the first PN code;
means for building connections between the second sector and a donor cell; and
means for transferring one or more mobile stations from the first sector to the second sector,
wherein determining that the first sector of the cell is overloaded comprises comparing the load of the first sector with a loading threshold, wherein the first sector is overloaded if the load of the first sector is greater than the loading threshold.

31. A non-transitory computer-program product for a wireless device configured for dynamic sector creation, the computer-program product comprising a non-transitory computer-readable storage medium having instructions thereon, the instructions comprising:
code for determining that a first sector of a cell is overloaded, wherein the first sector uses a first pseudo noise (PN) code;
code for, upon determining that the first sector of the cell is overloaded, creating a second sector of the cell within the first sector, wherein the second sector uses a second PN code that is different from the first PN code;
code for building connections between the second sector and a donor cell; and
code for transferring one or more mobile stations from the first sector to the second sector,
wherein determining that the first sector of the cell is overloaded comprises comparing the load of the first sector with a loading threshold, wherein the first sector is overloaded if the load of the first sector is greater than the loading threshold.

\* \* \* \* \*